(12) United States Patent
Jensen Moller

(10) Patent No.: US 7,638,165 B2
(45) Date of Patent: Dec. 29, 2009

(54) METHOD OF TREATING A SURFACE, COATING COMPOSITIONS AND USE THEREOF AND COATED SURFACES OBTAINABLE BY THE USE

(75) Inventor: Knud Erik Kristian Jensen Moller, Sonderso (DK)

(73) Assignee: Biopoint APS, Herlev (DK)

( * ) Notice: Subject to any disclaimer, the term of this patent is extended or adjusted under 35 U.S.C. 154(b) by 522 days.

(21) Appl. No.: 10/522,593

(22) PCT Filed: Jul. 16, 2003

(86) PCT No.: PCT/DK03/00499

§ 371 (c)(1),
(2), (4) Date: Jan. 25, 2005

(87) PCT Pub. No.: WO2004/011563

PCT Pub. Date: Feb. 5, 2004

(65) Prior Publication Data

US 2006/0040061 A1    Feb. 23, 2006

(30) Foreign Application Priority Data

| | | |
|---|---|---|
| Jul. 25, 2002 | (DK) | 2002 01135 |
| May 1, 2003 | (DK) | 2003 00654 |
| May 1, 2003 | (DK) | 2003 00655 |

(51) Int. Cl.
*B05D 3/02* (2006.01)

(52) U.S. Cl. ............... 427/195; 106/10; 106/11

(58) Field of Classification Search ............ 106/2, 106/3, 10, 11, 14.05, 14.11, 14.34
See application file for complete search history.

(56) References Cited

U.S. PATENT DOCUMENTS

| | | | |
|---|---|---|---|
| 2,902,376 A | * | 9/1959 | Beacher et al. ............. 106/10 |
| 3,726,820 A | * | 4/1973 | Bleyle et al. ............. 524/156 |
| 4,241,141 A | | 12/1980 | Dill |
| 4,317,755 A | * | 3/1982 | Gregory ................. 524/276 |
| 4,348,586 A | | 9/1982 | Kokorowski |
| 4,499,225 A | | 2/1985 | Kubo et al. |
| 4,693,900 A | | 9/1987 | Molinari |
| 4,895,881 A | | 1/1990 | Bigner |
| 5,091,272 A | * | 2/1992 | Treger ................... 429/62 |
| 5,258,063 A | * | 11/1993 | Cifuentes et al. ............ 106/3 |
| 5,387,434 A | | 2/1995 | Black |
| 5,746,812 A | | 5/1998 | Muller et al. |
| 5,750,269 A | | 5/1998 | Park |
| 5,814,172 A | | 9/1998 | Cox et al. |
| 6,033,736 A | | 3/2000 | Perlman et al. |
| 6,228,932 B1 | | 5/2001 | Saito |
| 2003/0075077 A1 | * | 4/2003 | Lewis .................. 106/271 |

FOREIGN PATENT DOCUMENTS

DE    197 43 566 A1    4/1999

(Continued)

*Primary Examiner*—Erma Cameron

(57) ABSTRACT

A method of treating a surface comprising the steps of providing a coating composition comprising particles of a polyolefin wax or of a mixture of polyolefin waxes suspended in a liquid phase; applying said coating composition to the surface; evaporating said liquid phase from the applied coating composition; and subjecting said dried, applied coating composition to a heating treatment to coalesce said wax particles.

29 Claims, 3 Drawing Sheets

FOREIGN PATENT DOCUMENTS

| | | |
|---|---|---|
| EP | 0 426 904 A1 | 5/1991 |
| EP | 0 798 349 A2 | 10/1997 |
| EP | 1 186 643 A1 | 3/2002 |
| FR | 2 157 074 A | 6/1973 |
| FR | 2 683 540 A1 | 5/1993 |
| GB | 1 220 244 A | 1/1971 |
| GB | 2 048 301 A | 12/1980 |
| JP | 52-076339 A | 6/1977 |
| JP | 61-074678 A | 4/1986 |
| JP | 08-187818 A | 7/1996 |
| WO | WO 80/01072 A1 | 5/1980 |
| WO | WO 93/25432 A1 | 12/1993 |
| WO | WO 94/29395 A1 | 12/1994 |

\* cited by examiner

METHOD OF TREATING A SURFACE, COATING COMPOSITIONS AND USE THEREOF AND COATED SURFACES OBTAINABLE BY THE USE

BACKGROUND OF THE INVENTION

The present invention relates to a method of treating exposed surfaces, e.g. for use in protection treatment of e.g. monuments, buildings and constructions having surface structures made of i.a. steel, aluminium, sandstone, marble, granite, slate, cement, fibre-reinforced cement, bricks, tiles, fibre glass-reinforced materials, and wood, as well as public and private transportation vehicles like busses, trains, trolleys, etc., and road and traffic signs, against graffiti and/or pollution, but also for use in anti-fouling treatment of ship hulls, and exposed surfaces obtainable by the method, and use thereof.

As used in the specification and claims, the term "graffiti" means any unwanted painting, drawing, lettering or other marking formed on a surface.

Although many countries have adopted strict environmental regulations which are intended to protect the environment against pollution from i.a. waste and combustion products, formation of deposits on and corrosion of surfaces of buildings, construction materials, public and private transportation vehicles, etc., caused by pollution still continue to cause problems.

Thus, it is desired to prevent formation of and/or remove such deposits of waste and combustion products, in particular smog; to prevent formation of reaction products formed by i.a. acid rains, sulphur oxides, and nitrogen oxides; and to provide easy removal of graffiti paintings on such surfaces.

Cleaning of such surfaces to remove pollution deposits, including graffiti, often requires application of high-pressure sand blasting treatments or treatment with hot steam or aggressive and hazardous chemical cleaning agents. Also, following such cleaning treatment the surfaces often have to be further renovated, and application of new surface treatments or paintings may be required.

Similarly anti-fouling treatment of ship hulls requires frequent cleaning and surface treatment, including high-pressure sand blasting treatments or treatment with aggressive and hazardous chemical cleaning agents, often followed by application of new paintings and/or fouling agents.

In particular for anti-fouling products, new very strict legislation is coming into force in several countries in order to prevent use of biocides, TBT, and heavy metals, which are presently polluting the water environment. Therefore, heavy efforts have been done to provide non-poisonous anti-fouling coatings.

Consequently, there is a need for an improved method and means for treating surfaces of buildings, construction materials, public and private transportation vehicles, ship hulls, etc., whereby less complicated cleaning methods are required to remove pollution or fouling deposits; and whereby application of environmentally hazardous agents, renovation and repainting can be avoided or reduced.

The present invention also relates to protection against pollution, wear by weather, graffiti, anti-fouling, bird droppings etc. by providing a method of treating a sheet with a coating composition and using the sheet for a protecting purpose. This can be accomplished either by treating a sheet with said method and thereby applying the sheet to the surface to be protected or by treating a sheet already applied to the surface to be protected with said method.

Sheets made of polymer materials are used in many aspects of the everyday life to display graphics on buses, cabs, and buildings. The sheets will meet requirements of durability, resistance and protection. The sheets may also be for indoor use. Several types of sheets exist on the market for the above-mentioned purposes of protection and advertising, etc. These sheets are often laminated to comprise a liner, an adhesive layer and a film, which film constitutes the outer surface. Also, sheets exists for the purpose of protecting surfaces, such as the front of a building, windows, road signs, tarpaulins, underwater structures. These sheets are also subject to the invention of protecting surfaces by treatment with a coating composition.

The present invention further relates to a method of applying a coating of a polyolefin wax to a sheet. The application of the polyolefin wax to the sheet involves providing a coating composition comprising particles of a polyolefin wax suspended in a liquid to the sheet followed by an evaporating of the liquid and a heat treatment to bring the wax particles into a coalescing state and allowing the wax particles to provide a continuous coating of the sheet and allowing the coating to consolidate to a protective coating.

REVIEW OF PRIOR ART

Protection Against Graffiti and Pollution

A method to counteract graffiti problems is to apply a protective coating onto a surface to protect it.

There are basically two types of coating.

The first type is a so-called "sacrificial coating" that prevents the transmission of graffiti through the coating and allows removal of the graffiti. However, by the removal process not only the graffiti but also the coating is removed, so that the protective coating-must be reapplied after removal of the graffiti.

The second type is a so-called "permanent coating" that prevents the transmission of graffiti through the coating, allows removal of the graffiti, and forms a strong bond with the surface allowing removal of the graffiti without removal of the coating.

U.S. Pat. No. 4,241,141 relates to a method for protecting surfaces from being permanently marked by graffiti which comprises coating the surface to be protected with a removable sacrificial coating composition consisting essentially of from 10 to 35% by weight of a polymer having a monomer content of 25 to 70% by weight hard monomer, 15 to 50% by weight soft monomer and 15 to 30% by weight acid monomer, the polymer having been neutralized with sodium hydroxide, potassium hydroxide, or mixtures thereof, from 0 to 15% of a potassium or sodium salt of an adduct of maleic anhydride and a mixed alpha olefin having chain lengths of more than 30 carbon atoms, from 0 to 2% of a coalescing solvent selected from the group consisting of diethylene glycol monoethyl ether, diethylene glycol monobutyl ethyl and mixtures thereof; from 0 to 3% of defoamers, levelling agents, and mixtures thereof; and 90 to 45% by weight of water; the composition having an MFT of less than 30° C. and a pH within the range of from 7.0 to 10.0; and b) allowing the sacrificial coating to dry. However, this coating requires cleaning solutions to remove it.

It is further mentioned in U.S. Pat. No. 4,241,141 that the application of the sacrificial coating can be carried out using any suitable application technique including brushing, wiping, rolling or spraying, where after the coating is allowed to dry or cure until it is dry to the touch. The drying step generally requires from about 10 to about 30 minutes although shorter dry time may be possible if the surface is heated to drive off the water.

U.S. Pat. No. 5,387,434 discloses another removable anti-graffiti coating comprised of (a) a member selected from the group consisting of waxes, sodium silicate, rosins and gums, and combinations thereof, and (b) water.

The member (a) is present in an amount from 5% to 80% by weight and in an amount effective to form a graffiti barrier on a surface to which the anti-graffiti coating material is applied. Any graffiti applied to the surface is intercepted by the graffiti barrier and can be removed by power washing the anti-graffiti coating with the graffiti from the surface.

The power washing is preferably carried out using water at a temperature within the range 120-194° F. and a pressure greater than 250 psi. A fresh anti-graffiti coating can be reapplied, as needed, to the washed surface.

U.S. Pat. No. 5,750,269 relates to a removable coating composition useful for protecting concrete, granite, marble, painted surfaces, etc., from graffiti comprising a) about 10 to 50 weight percent of an oxidized low molecular weight polyethylene wax having an acid number of 10 to 40, a Brookfield Thermosel viscosity of 50 to 2500 cP at 125° C., and a RBSP of 90 to 130° C., b) about 10 to 0.80 weight percent of a paraffin wax having a RBSP of 30 to 75° C., and c) about 10 to 80 weight percent of a thermoplastic acrylic copolymer containing 15 to 75 weight percent hard monomer, 20 to 70 weight percent soft monomer, and 0 to 30 weight percent acid monomer.

According to a preferred embodiment this composition is further comprising water such that the solids a), b), and c) are in an aqueous emulsion at total solids concentration of about 5 to 50 weight percent.

U.S. Pat. No. 5,750,269 relates also to a process of protecting a structure by applying an antigraffitic coating to the surface of a structure comprising applying the above-mentioned aqueous coating composition to said surface and drying said composition to remove water.

It is mentioned in U.S. Pat. No. 5,750,269 that this coating composition is easily removable, that it can be coated on any surface that is subject to the application of a coating that is not intended to be permanent (e.g. graffiti), and that this composition can be applied in the form of an emulsion by painting or spraying onto a surface such as concrete, etc. and then dried to form a protective coating for the substrate.

It is further mentioned that once a temporary or undesirable coating is applied, the layer of this composition can be easily removed along with the top coating simply by the application of hot water or steam, such as in the form of a spray or jet.

U.S. Pat. No. 4,348,586 relates to a surface treatment process for forming a removable coating protecting against bill-posting, penetration and attachment of graffiti and/or paint, and against the adherence of dust and polluting agents in which the surface is treated by means of an aqueous composition containing at least one synthetic wax of vegetable origin, one microcrystalline wax, or a mixture thereof having a melting point of between 45° C. and 110° C., followed by applying an anti-adhesive composition containing within an organic solvent without water at least one microcrystalline wax present in a mount of 10 to 30% by weight compared with the total weight of the composition and a silicone oil which is a methylpolysiloxane having a viscosity of 500 to 2,500,000 cs, a methylphenylpolysiloxane with a viscosity of between 10 and 100,000 cs or a mixture thereof present in an amount of 0.01 to 15% by weight compared with the total weight of the anti-adhesive composition.

EP 20577 relates to a removable coating composition. This composition contains in aqueous medium, at least a self emulsible-wax having a melting point between 45° C. and 110° C. A preferred embodiment comprises the use of a mixture of a synthetic wax of vegetal origin, a mineral wax and a micro crystalline wax. It is mentioned in EP 20577 that his composition, applied onto a support such as a wall is appropriate as a protection coating against bill-sticking, penetration and hooking of graffitis and/or paint and against adherence of dust and various polluting agents.

DE19743566 A1 relates to a permanent coating, more precisely to a wax based anti-graffiti coating (I) for subsequent application to exterior and/or interior surfaces comprises at least a microcrystalline polypropylene, polyethylene or polyetetrafluoroethylene based wax with a water insoluble binding agent. The amount of binding agent is typically 70-90 percent by weight.

Anti-Fouling Treatment of Ship Hulls.

The attachment and growth of marine fouling organisms to ships, marine structures etc. cause considerable problems, and various antifouling paints are in use for controlling the attachment and growth of marine fouling organisms.

A common type of antifouling paint is that which contains a biocidal agent dispersed in a suitable binder or a mixture of binders. During use the biocidal agent will dissolve and be released to the surrounding water and will thus provide an antifouling property.

In another type of antifouling paint an antifouling agent, which is chemically bound to a binder gradually, dissolves or hydrolyzes in water to release the antifouling agent.

A paint of this type is based on acrylic polymers in which carboxyl groups have been esterified with organotin groups. During use the polymers will be hydrolyzed in sea water to release free trialkyltin compounds, acting as an antifouling agent During recent years increasing restrictions have been made with respect to the use of biocidal agents in paints. There is accordingly a need for anti-fouling coatings, which do not exhibit these undesired properties.

U.S. Pat. No. 5,814,172 relates to a method of inhibiting marine growth on a structure exposed to a submarine environment, which comprises:

Forming a sheet having a portion comprised of a biocide particulate having an average particle size diameter of greater than 5 microns dispersed in a polymerized first resin which is thermoplastic; the sheet portion having isotropic mechanical properties and being inelastically elongatable within the plane of the sheet;

adhering the sheet to the surface of the structure in combination with stretching the sheet to thereby permanently elongate the sheet in the plane of the sheet, to provide a barrier to the submarine environment;

wherein, a portion of the biocide particulate in the sheet is exposed to the submarine environment.

EP 643657 A1 relates to a vessel brought forward in a fluid medium meeting a resistance of flow due to friction against the surrounding medium.

EP 643657 A1 deals with the problem how to reduce overgrowth and the frictional resistance between a vessel in movement and the surrounding medium.

According to EP 643657 A1 this problem is solved by a vessel or other marine construction comprising a coating in the form of an anti-fouling fiber flock comprising synthetic fibers having lengths between 0.5 and 5 mm and no antifouling toxic chemicals, electrostatically applied to at least a portion of surfaces thereof which are intended to come into contact with water, at a density of 50 to 300 fibers per square mm and wherein said fibers are adhered essentially perpendicular to said surfaces.

EP 643657 A1 further relates to a method of preventing overgrowth on surfaces under the water line of vessels and other marine constructions, comprising:

Applying an adhesive to underwater surfaces thereof, electrostatically applying a fiber flock, comprising synthetic fibers having lengths between 0.5 and 5 mm and no antifouling toxic chemicals, to at least a portion of the underwater surfaces, said fiber flock being adhered essentially perpendicular to said surfaces with said adhesive, at a density of 50 to 300 fibers per square mm.

EP 426904 A1 relates to a method for applying a coating to a substrate, in particular the outer surfaces of ships' hulls in order to protect them from fouling by exposure to marine organisms in a submerged aquatic environment, whereby the coating consists of polymerized fluorocarbon material which is thermally fused to the substrate, for example by means of a coherent form of radiation, e.g. a laser beam, whereby the fluorocarbon coating absorbs sufficient energy to melt and pass sufficient energy to heat the substrate at and near the interface, to bond the coating and the substrate interface.

According to a preferred embodiment, the fluorocarbon material is electrostatically sprayed onto the substrate and is then thermally fused to the substrate.

FR 2157074 relates to a method for protecting i.a. outer surfaces of ships' hulls from fouling by which these surfaces are coated with a coating based on a fluor carbon resin, such as polytetrafluorethylene.

U.S. Pat. No. 4,895,881 relates to an anti-fouling composition for coating on a surface intended to be submerged in water comprising a binder, form 1 to 50% of polytetrafluoroethylene particles, based on the dry weight of the composition, and from 5 to 95%, based on the dry weight of the composition, of an antifouling agent selected from the group consisting of copper metal and copper and zinc compounds, and also comprising a liquid dispersion medium, including at least one halogenated hydrocarbon, the polytetrafluoroethylene particles being dispersed in said liquid dispersion medium.

This coating composition may further contain additional amounts of binders, for instance epoxy resins and other binders of a thermoplastic or of a curable type, which are suitable in combination with fluorocarbon polymers.

These coatings may be applied in different manners, for instance with a paint brush, a roller, by spraying, dipping, flow coating and it is mentioned in U.S. Pat. No. 4,895,881 that these coatings may even be melted (sintered) on the substrate through heating, for instance over 280° C., such as 300-315° C., during 1-20 minutes, for instance 5-10 minutes, or flame sprayed.

Other Technical Fields

U.S. Pat. No. 4,499,225 relates to a coating composition, which can be used for coating various electrical parts, automobile parts, etc. An excellent appearance, good chemical resistance, high insulation properties and a good water resistance are achieved. The coating composition consists essentially of a film-forming component dispersed in water, said film-forming component comprising 60 to 99 wt. % of a powder containing as a main component one or more resins selected from the group consisting of polyethylene, polypropylene and their derivatives and 1 to 40 wt. % of a low molecular weight oxidized polyethylene and/or its derivative. The coating thickness achieved according to the stated test examples 1-3 are between 200 and 350 microns. For application of the coating compositions spray coating, dip coating, electro-coating, etc. may be used. In the test example 1 and 2 the coating composition was baked at 200° C. for 10 minutes and in test example 3 at 180° C. for 10 minutes after application of the coating composition.

U.S. Pat. No. 6,033,736 relates to an aqueous wax emulsion for use as a paint primer and paint repair adhesive and describes a method of improving the adhesion and durability of both new paint coatings, and older cracked or peeling paint coatings on an architectural surface. The method comprises applying an aqueous wax emulsion to a surface, said emulsion comprising 2-50 wt. % of at least one water-dispersible microparticulate wax, at least one emulsifier and between 40-98 wt. % water, where the emulsion is applied and is allowed to dry before applying a paint overcoat. The wax may be carnauba wax, animal waxes, mineral waxes, e.g. paraffin and microcrystalline waxes and synthetic waxes, e.g. Fischer-Tropsch waxes. The synthetic waxes may also be polyethylene wax and chemically modified hydrocarbon waxes. The melting point of the wax can be in excess of 100° C. but is preferably between 50-100° C. The coating has been observed with microscope and it was confirmed that the wax microparticles remain morphologically discrete in the dried coating. According to the description of U.S. Pat. No. 6,033,736 it is believed that the microscopically porous beaded surface of a coating allows a paint to firmly anchor itself to the wax.

The methods described also permits the subsequent convenient removal of paint. Thus, if the aqueous wax emulsion is used as a primer, the paint above the primer can be easily removed using pressurized hot water to melt the primer coating of wax, carrying away the old paint.

DISCLOSURE OF THE INVENTION

Object of the Invention

It is an object of the present invention to provide an improved method of treating a surface, in particular to provide an improved method of providing a surface with a protecting coating.

In particular, it is an object of the present invention to provide improved methods of 1. providing a surface with an essentially permanent anti-graffiti coating;
2. providing a surface with an essentially permanent coating protecting against pollution and corrosion; and
3. providing an under water structure, e.g. a ship hull, with an essentially permanent anti-fouling coating.

Another object of the present invention is to provide a coating composition, in particular an anti-graffiti coating composition, which is inexpensive to manufacture, easy to apply, and environmentally safe in use.

It is an object of the present invention to provide an improved method of protection against graffiti, pollution and corrosion.

It is an object of the present invention to provide an improved method of treating a surface of a sheet, in particular to provide an improved method of providing a surface of a sheet with a protecting coating.

Another object of the present invention is to provide a method of producing a coated sheet, in particular to provide an improved method of producing a sheet with a protecting coating.

Another object is to provide an improved method of protecting a surface of a structure, in particular to provide an improved method of coating a sheet on the structure.

In particular, it is an object of the present invention to provide improved methods of:

Providing a surface of a sheet with an essentially permanent anti-graffiti coating;

providing a surface of a sheet with an essentially permanent coating protecting against pollution and corrosion.

Further objects appear from the description elsewhere.

Statement of Invention

According to an aspect of the present invention, there is provided a coating composition comprising particles of a polyolefin wax or of a mixture of polyolefin waxes suspended in a liquid phase.

In this text the term "polyolefin" is intended to designate: "A polymer prepared by the polymerization of olefins as the sole monomers, copolymers thereof as well as oxidized and or halogenated, in particular fluorinated derivates thereof".

The term "a mixture of polyolefin waxes" is intended to designate: "A macroscopically homogeneous mixture of two or more different species of polymer, including cases, where the blends are homogeneous on scales smaller than several times visual optical wavelengths".

A polyolefin wax is characterized by an intermediate number of carbon atoms in the polyolefin backbone as explained in the following. The number of carbon atoms in a carbon hydride, n, in the carbon backbone, $C_n$, determines the physical state of the substance at room temperature and atmospheric pressure: $C_1$ to $C_4$ corresponds to a gaseous state, $C_5$ to $C_8$ corresponds to a liquid state, $C_9$ to $C_{500}$ corresponds to a waxy solid state, and well above 500 carbon atoms corresponds to a macromolecule, a resinous polymer. The above values for n are meant for illustrating purposes only for illustrating the transition from a gaseous state to a solid state upon increasing n. The actual value of n for a given real material depends on the type of the monomer used in manufacturing the carbon hydride molecules.

One advantage of using a polyolefin wax is believed to be the ability of the polyolefin wax to flow in a heating treatment at elevated temperatures, thus being a liquid with a low viscosity, and subsequently during and after the heating treatment, consolidating to a thin coating of a solid state polymer with chemical inertness and mechanical resistance.

In one embodiment the polyolefin wax is selected from the group consisting of a homopolymer, a co-polymer, a block-copolymer and a random copolymer and mixtures thereof.

One advantage of using a polyolefin wax, as a coating material is the low surface energy exhibited by polyolefins.

Other advantages of using particles of a polyolefin wax material are stated below with reference to i.a. the material parameters of chemical composition, molecular structure, melt index, viscosity, melt flow ratio, particle size, and molecular weight.

A polyolefin wax may also be defined as a polymer of an olefin, which polymer has a low polymerization degree.

The alkanes of the polyolefin wax may have a molecular weight distribution that is essentially symmetric when plotted on a semi-logarithmic scale. The peak molecular weight $M_p$, defined as the molecular weight at the maximum of the molecular weight distribution, may fall between the number- $M_n$, and weight-average $M_w$ molecular weight values for a normal distribution curve. In one embodiment the molecular weight distribution is homogenous and unimodal.

The synthetic wax may be synthesized by a high-pressure polymerization or a low-pressure (Zeigler-type catalysts) polymerization. It may be a by-product produced in making polyethylene plastic resin. Further, it may be distilled under vacuum to obtain a narrower molecular weight distribution.

In one embodiment the process of manufacturing the polyolefin wax is based on the Fischer-Tropsch synthesis.

In one embodiment a metallocene catalyst is used in the process of manufacturing the polyolefin wax.

In one embodiment the polyolefin wax is a thermoplastic material.

According to preferred embodiments the liquid phase of the coating composition has a boiling point or a boiling point range lower than the melting point or melting point range of the particles of the polyolefin wax or of the mixture of polyolefin waxes.

The liquid phase should be based on a liquid or a mixture of liquids which are readily vaporizable at a relatively low temperature, i.e. about 50 to 110° C.; environmentally acceptable, and suitable for carrying a suspension of particles of polyolefin wax.

In one embodiment the liquid or mixture of liquids are readily vaporizable at a temperature between 50 and 110° C., preferably between 70 and 110° C., preferably between 75 and 100° C., preferably between 75 and 99° C., preferably between 75 and 95° C., The melting point or melting point range of the particles of the polyolefin wax or of the mixture of polyolefin waxes may preferably be between 60 and 250° C., in particular between 90 and 140° C.

According to preferred embodiments the liquid phase of the coating composition is organic.

The liquid phase of the coating composition may consist essentially of a member of the group consisting of ethers, esters, ketones, alcohols and mixtures thereof.

It may comprise an alcohol, preferably ethyl alcohol, and optionally water, whereby the concentration of water, calculated on weight basis, in the liquid phase may be up to 50%.

In one embodiment the liquid phase of the coating composition comprises an alcohol, preferably ethyl alcohol.

According to other preferred embodiment the liquid phase of the coating composition may be essentially aqueous.

In one embodiment the liquid phase of the coating composition consists essentially of ethyl alcohol, 96% ethanol.

In one embodiment the liquid phase of the coating composition comprises an alcohol, preferably ethyl alcohol, and water.

In one embodiment the coating composition contains, calculated on weight basis:

Polyolefin wax/mixture of polyolefin waxes 1-25%, preferably 9-13%,—liquid phase 99-75%, preferably 91-87%.

Further, the coating composition may comprise one or more auxiliary agents selected from the group consisting of diluting agents, dispersing agents, conservation agents, emulsifying agents, and colouring agents, whereby the coating composition, calculated on weight basis, may contain up to 10% auxiliary agents.

The colouring agents may be selected from colouring gents based on dies or pigments.

According to other preferred embodiments the coating composition is consisting essentially of particles of a polyolefin wax or of a mixture of polyolefin waxes suspended in a liquid phase.

In one embodiment the coating composition is consisting essentially of particles of a polyolefin wax suspended in a liquid phase.

In one embodiment the coating composition is consisting essentially of particles of a mixture of polyolefin waxes suspended in a liquid phase.

According to other preferred embodiments the coating composition is consisting essentially of particles of a polyolefin wax or of a mixture of polyolefin waxes suspended in a liquid organic or aqueous phase and one or more auxiliary agents selected from the group consisting of diluting agents, dispersing agents, conservation agents, emulsifying agents, and colouring agents.

A preferred polyolefin wax has the characteristics of being easily dispersed in a liquid phase. In one embodiment the polyolefin wax disperses with substantially no additives to improve the dispersion process.

In one embodiment the polyolefin wax or the components in the mixture of polyolefin waxes suspended in the coating composition are selected from the group consisting of polyethylene waxes, polypropylene waxes and oxidized and/or halogenated, in particular fluorinated polyethylene and polypropylene waxes.

In one embodiment the polyolefin wax or the components in the mixture of polyolefin waxes suspended in the coating composition is having a degree of polymerisation between 1.0 and 3000, in particular between 10 and 500, in particular between 20 and 300, in particular between 30 and 200, in particular between 30 and 150, in particular between 30 and 100, in particular between 8 and 100, in particular between 20 and 80.

The degree of polymerisation is defined as the number of monomers polymerized to form the polymer.

In one embodiment the polyolefin wax or the components in the mixture of polyolefin waxes suspended in the coating composition is an oxidised polyethylene wax.

In one embodiment the polyolefin wax is an oxidized polyethylene wax, with an acid number in the interval of 1 to 100 mg KOH/g, preferably in the interval of 1 to 40 mg KOH/g, more preferably in the interval of 1 to 30 mg KOH/g, even more preferably in the interval of 2 to 20 mg KOH/g, yet more preferably in the interval of 2 to 10 mg KOH/g.

In one embodiment the polyolefin wax or at least one of the components in the mixture of polyolefin waxes suspended in the coating composition is a polyethylene wax.

In one embodiment the polyolefin wax is essentially a polyethylene wax.

In one embodiment the particle size of the polyethylene wax is between 0.1 and 100 µm, preferably between 2 and 25 µm, in particular between 4 and 20 µm.

In one embodiment the melting point of the polyethylene wax is between 70 and 200° C., preferably between 90 and 150° C., in particular between 90 and 120° C.

In one embodiment the peak melting point of the polyethylene wax is between 70 and 145° C., preferably between 80 and 140° C., in particular between 90 and 135° C., in particular between 95 and 130° C., in particular between 99 and 128° C., in particular between 95 and 120° C. The peak melting point may be determined by a differential scanning calorimetry (DSC) method that provides a thermogram, a plot of the instantaneous heat capacity as a function of temperature. The peak melting point is taken as the peak of the thermogram-plot.

In one embodiment the polyethylene wax is having a degree of polymerisation between 10 and 3000, in particular between 10 and 2000, in particular between 10 and 1000, in particular between 10 and 500, in particular between 20 and 300, in particular between 30 and 200, in particular between 40 and 150, in particular between 40 and 100.

In one embodiment the polyethylene wax is having a degree of polymerisation between 50 and 3000, in particular between 50 and 1500, in particular between 60 and 1000.

In one embodiment the polyethylene wax is consisting of essentially linear polyethylene molecules.

In one embodiment the polyethylene wax is characterised as high-density polyethylene, HDPE. HDPE have densities falling in the range of 0.94-0.99 g/cm$^3$ and it consists of primarily unbranched polyethylene.

In one embodiment the polyethylene wax has a viscosity at 149° C. of 2000 mPa s or less, 1000 mPa s or less, 300 mPa s or less, preferably 200 mPa s or less, preferably 150 mPa s or less preferably 10 mPa s or less, preferably 70 mPa s or less, preferably 50 mPa s or less, preferably 40 mPa s or less, preferably 20 mPa s or less, preferably 10 mPa s or less, preferably 5 mPa s or less.

The values are taken as zero shear viscosity values. The zero shear viscosity is the apparent viscosity at zero shear rate and is not a directly measurable value, but can be obtained by extrapolation from observed viscosities over a range of finite shear rates.

In one embodiment the polyethylene wax has a molecular weight distribution, $M_W/M_n$, of 1 to 25, preferably of 1 to 10, preferably of 1 to 5, preferably of 1 to 3, preferably of 1 to 2, preferably of 1 to 1.5, preferably of 1 to 1.2. In the traditional way of determining the parameters of $M_W$ and $M_n$, the $M_W$-value is always lower or equal to the value of $M_n$, see "Handbook of polyethylene", A. J. Peacock, Marcel Dekker Inc., 2000, pp. 7-10 for a definition of $M_W$ and $M_n$ and their relationship. The parameter of melt flow ratio is an approximate measure for the parameter of molecular weight distribution as a general trend.

In one embodiment the polyethylene wax has a molecular weight $M_n$ in the interval of 400 to 3500 and a molecular weight distribution, $M_W/M_n$, of 6.0 or less, preferably has a molecular weight $M_n$ in the interval of 400 to 3500 and a molecular weight distribution, $M_W/M_n$, of 4.0 or less, more preferably a molecular weight $M_n$ in the interval of 400 to 3500 and a molecular weight distribution, $M_W/M_n$, of 2.0 or less.

In one embodiment the polyethylene wax has a molecular weight $M_n$ in the interval of 400 to 40000 and a molecular weight distribution, $M_W/M_n$, of 5.0 or less, preferably a molecular weight distribution, $M_W/M_n$, of 4.0 or less, preferably a molecular weight distribution, $M_W/M_n$, of 3.0 or less.

According to another preferred embodiment the polyolefin wax, or, if a mixture of polyolefin waxes is desired, one of the components in the mixture of polyolefin waxes suspended in the coating composition is a polyethylene wax, whereby the particle size of the polyethylene wax may be between 0.1 and 100 µm, preferably between 2 and 25 µm, in particular between 4 and 20 µm, and the melting point of the polyethylene wax may be between 70 and 200° C., preferably between 90 and 150° C., in particular between 90 and 130° C., in particular between 90 and 120° C.

In one embodiment the polyethylene wax has a degree of polymerisation between 10 and 500, in particular between 20 and 300, in particular between 30 and 200, in particular between 30 and 150, in particular between 30 and 100 and a particle size between 0.1 and 100 μm, preferably between 2 and 25 μm, in particular between 4 and 20 μm, and a peak melting point between 70 and 145° C., preferably between 80 and 140° C., in particular between 90 and 135° C., in particular between 95 and 120° C., and a viscosity at 149° C. of 300 mPa s or less, preferably 200 mPa s or less, preferably 150 mPa s or less, preferably 100 mPa s or less, preferably 70 mPa s or less, preferably 50 mPa s or less, preferably 40 mPa s or less, preferably 20 mPa s or less, preferably 10 mPa s or less, preferably 5 mPa s or less, and a molecular weight distribution, $M_w/M_n$, between 1 and 10, preferably between 1 and 5, preferably between 1 and 3, preferably between 1 and 2, preferably between 1 and 1.5, preferably between 1 and 1.2.

In one embodiment the polyethylene wax has a degree of polymerisation between 50 and 3000, in particular between 50 and 1500, in particular between 60 and 1000 and a particle size between 0.1 and 50 μm, preferably between 2 and 25 μm, in particular between 3 and 10 μm, and a DSC melting point between 90 and 145° C., preferably between 90 and 132° C., in particular between 95 and 132° C., in particular between 100 and 130° C., and a viscosity at 149° C. of 2000 mPa s or less, preferably 1000 mPa s or less, preferably 400 mPa s or less, preferably 150 mPa s or less, preferably 70 mPa s or less, preferably 30 mPa s or less, preferably 10 mPa s or less, preferably 5 mPa s or less, and a molecular weight distribution, $M_w/M_n$, between 1 and 10, preferably between 1 and 5, preferably between 1.2 and 4.

In one embodiment the polyolefin wax is the polyethylene wax, Shamrock S-394, SP 5, average particle size: 18 μm, from Shamrock Technologies, specific gravity: 0.95 g/cm$^3$, DSC melt point: 113° C., Softening point: 99° C.

In one embodiment the polyolefin wax is the polyethylene wax, Shamrock S-394, N 5, average particle size: 12.5 μm, from Shamrock Technologies, specific gravity: 0.95 g/cm$^3$, DSC melt point: 113° C., Softening point: 99° C.

In one embodiment the polyolefin wax is the polyethylene wax, Shamrock S-394, N 1, average particle size: 5 μm, from Shamrock Technologies, specific gravity: 0.95 g/cm$^3$, DSC melt point: 113° C., Softening point: 99° C.

The above parameter values were specified by the manufacturer. Some parameters for Shamrock S-394, N 1 were also measured by the Danish Polymer Centre, which resulted in a DSC peak melting temperature of 101.4° C. and a viscosity of, 16 mPa s at 129° C. measured with a Rheometrics Mechanical Spectrometer RMS800. Furthermore size exclusion chromatography was performed for Shamrock S-394, N 1. From the resulting chromatogram the peak molecular weight was read to be 1200 g/mol and the polydispersity was calculated to be 1.5.

In one embodiment the polyolefin wax is the polyethylene wax, DAVOSI, supplied by Dansk Voksfabrik A/S, Copenhagen, specific gravity: 0.96-0.98 g/cm$^3$, drop forming point (DGF-M-III 3): 125° C., acid value: approximately 4 mg KOH/g, particle size 8-14 μM.

The above parameter values were specified by the manufacturer. Some parameters were also measured by the Danish Polymer Centre, which resulted in a DSC peak melting temperature of 126.8° C. and a viscosity of 240 mPa s at 149° C. measured with a Rheometrics Mechanical Spectrometer RMS800. Furthermore size exclusion chromatography was performed for DAVOSI. From the resulting chromatogram the peak molecular weight was read to be 10000 g/mol and the polydispersity was calculated to be 2.6.

In one embodiment the polyolefin wax is the POLYWAX 500 from Baker Petrolite, melt point approx. 71° C. In one embodiment the polyolefin wax is the POLYWAX 655 from Baker Petrolite, melt point approx. 87° C. In one embodiment the polyolefin wax is the POLYWAX 850 from Baker Petrolite. In one embodiment the polyolefin wax is the POLYWAX 1000 from Baker Petrolite, melt point approx. 103° C. In one embodiment the polyolefin wax is the POLYWAX 2000 from Baker Petrolite, melt point approx. 112° C. In one embodiment the polyolefin wax is the POLYWAX 3000 from Baker Petrolite, melt point approx. 115° C. All the above-mentioned POLYWAX products are ethylene homopolymers, which are, linear and characterised by a molecular weight distribution, $M_w/M_n$ of approximately 1.1 and are highly crystalline.

In one embodiment the polyolefin wax or at least one of the components in the mixture of polyolefin waxes suspended in the coating composition is a polypropylene wax.

In one embodiment the polyolefin wax is essentially a polypropylene wax. In one embodiment the polyolefin wax or at least one of the components in the mixture of polyolefin waxes suspended in the coating composition is a co-polymer of propylene and one or more other olefins.

In one embodiment the particle size of the polypropylene wax is between 0.1 and 100 μm, preferably between 2 and 25 μm, in particular between 4 and 20 μm.

In one embodiment the peak melting point of the polypropylene wax is between 70 and 250° C., preferably between 70 and 200° C., preferably between 100 and 180° C., preferably between 100 and 170° C., in particular between 110 and 160° C., in particular between 120 and 150° C., in particular between 100 and 140° C.

In one embodiment the polypropylene wax is consisting of essentially unbranched polypropylene molecules. A decrease in branching of the polypropylene molecules results in a narrower melting distribution.

In one embodiment the polypropylene wax is characterised as consisting of essentially isotactic polypropylene molecules. Isotactic polypropylene consists of molecules in which all methyl groups have the same stereo-chemistry as a result of all insertions of propylene monomer being identical.

In one embodiment the polypropylene wax is characterised as consisting of essentially syndiotactic polypropylene molecules. Regular alternating stereochemistry of monomer insertion, resulting in alternating locations of the pendent methyl groups, produces syndiotactic polypropylene.

In one embodiment the polypropylene wax is characterised as consisting of essentially stereo block polymer structures, i.e. molecules having segments being syndiotactic or isotactic. In one embodiment the polypropylene comprises atactic polypropylene exhibiting random location of the pendent methyl groups.

In one embodiment the polypropylene wax has a viscosity at 190° C. of 400 mPa s or less, preferably 200 mPa s or less, preferably 150 mPa s or less, preferably 100 mPa s or less, preferably 70 mPa s or less, preferably 50 mPa s or less, preferably 40 mPa s or less, preferably 20 mPa s or less, preferably 10 mPa s or less.

In one embodiment the polypropylene wax has a melt flow at 230° C./2.16 kg of 40 g/min or more, preferably 100 g/min or more, preferably 500 g/min or more, preferably 1000 g/min or more, preferably 4000 g/min or more, preferably 8000 g/min or more. The melt flow is measured as the weight of molten polymer flowing at 230° C. for 10 min. through a 2.095-mm diameter die at a 2.16 kg load according to ASTM test D1238L.

In one embodiment the polypropylene wax has a molecular weight distribution, $M_w/M_n$, of between 1 and 25, preferably of between 1 and 10, preferably of between 1 and 5, preferably of between 1 and 3, preferably of between 1 and 2, preferably of between 1 and 1.5, preferably of between 1 and 1.2.

According to another preferred embodiment the polyolefin wax or, if a mixture of polyolefin waxes is desired, one of the components in the mixture of polyolefin waxes suspended in the coating composition is a polypropylene wax, whereby the particle size of the polypropylene wax may be between 0.1 and 100 µm, preferably between 2 and 25 µm, in particular between 4 and 20 µm, and the melting point of the polypropylene wax may be between 70 and 250° C., preferably between 100 and 180° C., in particular between 100 and 140° C.

In one embodiment the polyolefin wax suspended in the coating composition is a co-polymer of propylene with a particle size between 0.1 and 50 µm, preferably between 0.5 and 25 µm, in particular between 2 and 20 µm, and with a peak melting point of the polypropylene wax between 70 and 250° C., preferably between 100 and 180° C., in particular between 120 and 170° C., and a degree of polymerisation between 50 and 3000, in particular between 50 and 1500, in particular between 60 and 1000, and a viscosity at 149° C. of 2000 mPa s or less, preferably 1000 mPa s or less, preferably 300 mPa s or less, preferably 150 mPa s or less, preferably 70 mPa s or less, preferably 40 mPa s or less, preferably 20 mPa s or less, preferably 10 mPa s or less, preferably 5 mPa s or less, and a molecular weight distribution, $M_w/M_n$, of 1 to 5, preferably of 1 to 2, preferably of 1 to 1.5.

In one embodiment the polyolefin wax is the Polypropylene copolymer wax powder, Shamrock S 363, Average particle size: 5 µm, Specific gravity: 0.94 g/cm$^3$, DSC melt point: 140° C., Softening point: 68° C.

According to another preferred embodiment the polyolefin wax or one of the components in the mixture of polyolefin waxes suspended in the coating composition is a polytetrafluorethylene wax. However, polytetrafluorethylene wax is preferably used in mixtures or alloys with other polyolefin waxes.

The particle size of the polytetrafluorethylene wax may be between 0.1 and 100 µm, preferably between 2 and 25 µm, in particular between 4 and 20 µm, and the melting point of the polytetrafluorethylene wax may be between 250 and 360° C., preferably between 260 and 330° C., in particular between 280 and 320° C. In one embodiment the coating composition is the PTFE: 60% aqueous dispersion of polytetrafluorethylene, Shamrock FLUORO AQ 60, Average particle size: 2-3 µm, pH: 7-8, Apparent density: 1.47

In one embodiment the polyolefin wax or the components in the mixture of polyolefin waxes suspended in the coating composition consists essentially of one or more of the alkanes selected from the group of alkanes determined by the generic formula $CH_3CHR_1$—$(CH_2CHR_1)_n$—$CHR_1$—$CH_3$ for n equal to:

15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, where $R_1$=H or $CH_3$.

In one embodiment the polyolefin wax or the components in the mixture of polyolefin waxes suspended in the coating composition consists essentially of one or more of the alkanes selected from the group of alkanes determined by the generic formula $CH_3CHR_1$—$(CH_2CHR_1)_n$—$CHR_1$—$CH_3$ for n equal to:

49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, where $R_1$=H or $CH_3$.

In one embodiment the polyolefin wax or the components in the mixture of polyolefin waxes suspended in the coating composition consists essentially of one or more of the alkanes selected from the group of alkanes determined by the generic formula $CH_3CHR_1$—$(CH_2CHR_1)_n$—$CHR_1$—$CH_3$ for n equal to:

249, 250, 251, 252, 253, 254, 255, 256, 257, 258, 259, 260, 261, 262, 263, 264, 265, 266, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, where $R_1$=H or $CH_3$.

In one embodiment the polyolefin wax or the components in the mixture of polyolefin waxes suspended in the coating composition consists essentially of one or more of the alkanes selected from the group of alkanes determined by the generic formula $CH_3CHR_1$—$(CH_2CHR_1)_n$—$CHR_1$—$CH_3$ with a value of n between 430 and 3000, preferably of n between 430 and 2000, preferably of n between 430 and 1000.

In one embodiment the alkanes has a number of alkyl groups situated on the carbon backbone of the alkanes as branches, which number is 30 or less, preferably 20 or less, more preferably 10 or less, even more preferably 5 or less.

In one embodiment the alkyl groups situated on the carbon backbone of the alkane are selected from the group consisting of methyl, ethyl, propyl, butyl, pentyl, hexyl, heptyl, octyl, preferably from the group consisting of ethyl, butyl, hexyl, octyl, more preferably from the group consisting of ethyl and butyl, yet more preferably is ethyl.

In one embodiment $R_1$=$CH_3$ and all the methyl groups have the same stereochemistry.

In one embodiment $R_1$=$CH_3$ and the stereochemistry changes from one methyl group to a neighbouring other methyl group.

In one embodiment $R_1$ $CH_3$ and the molecular structure is a stereo block.

According to an aspect of the present invention, there is provided a method of treating a surface comprising the steps of providing a coating composition comprising particles of a polyolefin wax or a mixture of polyolefin waxes suspended in a liquid phase, wherein the mixture of polyolefin wax or the components in the mixture of polyolefin waxes are selected from the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected from the group consisting of diluting agents, dispersing agents, conservation agents, emulsifying agents and coloring agents;

applying said coating composition to the surface;

evaporating said liquid phase from the applied coating composition; and subjecting said dried, applied coating composition to a heating treatment to coalesce said wax particles.

According to another aspect of the present invention, there is provided a method of providing a surface with a protecting coating by applying a coating composition to the surface. The coating composition comprises—particles of a polyolefin wax or of a mixture of polyolefin waxes suspended in a liquid phase, wherein the mixture of polyolefin wax or the components in the mixture of polyolefin waxes are selected from the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected from the group consisting of diluting agents, dispersing agents, conservation agents, emulsifying agents and coloring agents;

evaporating said liquid phase from the applied coating composition;

subjecting said dried, applied coating composition to a heating treatment to raise the temperature of the dried coating composition to bring said particles of a polyolefin wax or of a mixture of polyolefin waxes into a coalescing state allowing said wax particles to provide a continuous coating of the surface; and allowing said heat treated coating composition to consolidate to a protective coating.

The polyolefin wax particles preserve their shapes during the evaporation of the liquid phase from the applied coating composition and the particles are essentially left in a dried state when substantially all the liquid phase has evaporated.

"Coalesce"/"coalescence" is intended to designate: "to form/the formation of a coherent phase from an incoherent phase of separate particles by fusion or growing together of the particles".

The formed coherent phase may consist of a polyolefin material with openings. The openings arise due to the fact that some particles that coalesce to form a coherent phase do not entirely fill out and cover the surface, prior to coalescence, between them. In this way a continuous coating with openings or holes is formed.

According to an aspect of the invention the particle size is relatively small such that substantially the entire particle is softening upon the heating treatment, thus leaving substantially none of the inner volume of the particle unaffected by the heating treatment, such that the particle is capable of coalescing with the other particles.

In one embodiment of the invention the viscosity of the polyolefin wax undergoes a transition to a lower value quickly, relative to the time the polyolefin wax particles are subjected to non-excessive heating; By "non-excessive heating" is meant a heating condition where the chemical structure of the particle material is not compromised, and/or the substrate material subjected to the heating treatment is not compromised.

In one embodiment a low melt flow ratio is preferred in order to let all the polyolefin wax molecules respond uniformly to the heating treatment.

In one embodiment of the invention the particle material is a polyolefin wax, which has an advantageous value of all or nearly all of the following physical parameters and characteristics: chemical inertness, mechanical resistance, melt index, viscosity, melt flow ratio and particle size.

In one embodiment the polyolefin wax re-crystallizes- to form another crystal structure than the crystal structure of the polyolefin wax particles of the coating composition upon allowing said heat treated coating composition to consolidate to a protective coating. In one embodiment the process associated with the consolidation of a protective coating results in amorphous regions of polyolefin wax and/or interfacial regions between crystalline and amorphous regions. The definition of "crystalline region", "amorphous region", and "interfacial region" can be found in "Handbook of polyethylene", A. J. Peacock, Marcel Dekker Inc., 2000, p. 68 and the accompanying FIG. 1, which is hereby incorporated by reference.

The evaporation step can be carried out by allowing the applied coating composition to evaporate at room/ambient temperature, but heat may also applied using well-known heating apparatus.

The heating treatment by which the wax particles are brought into a coalescing state can be carried out using well-known heating apparatus, e.g. using IR radiation or hot air or hot gas.

According to preferred embodiments of these methods the liquid phase of the coating composition has a boiling point or a boiling point range lower than the melting point or melting point range of the particles of the polyolefin wax or of the mixture of polyolefin waxes. Hereby it may be obtained that liquid phase is essentially evaporated before the temperature of the wax particles becomes so high that they enter into the coalescing state, i.e. before the continuous coating of the surface is formed.

In one embodiment the coating composition is applied to the surface by spraying.

The application of the coating composition can be carried out using any suitable application technique including brushing, wiping, or rolling according to a preferred embodiment the coating composition is applied to the surface by spraying. In one embodiment the coating composition resulting from dispersing the polyolefin wax in the liquid phase, is capable of being applied to the surface to be coated, preferably without using high-pressure applications. The coating composition is preferably capable of being applied with a spray bottle worked by hand.

When the method is used as protection treatment against graffiti the coating composition is applied in an amount effective to prevent graffiti markings applied to the coated surface from penetrating through the protective coating to the underlying surface.

When the method is used as protection treatment against attack by aggressive gases or liquids the coating composition is applied in an amount effective to prevent the aggressive gases or liquids contacting the coated surface from penetrating through the protective coating to the underlying surface.

According to a preferred embodiment the coating composition. Is applied to the surface in an amount of 50 to 350 ml per $m^2$.

The amount of the applied coating composition is determined by the porosity and nature of the surface to be treated or protected. Further, the weight percentage of the polyolefin wax/mixture of polyolefin waxes in the coating composition is also determined by the porosity and nature of the surface to be treated or protected.

In one embodiment the amount of applied coating composition is determined by the desired thickness of the coating. In one embodiment the thickness of the achieved coating is less than 20 μm, preferably less than 10 μm, preferably less than 5 μm, preferably less than 1 μm.

Typical concentrations and amounts of the applied coating composition appears from the following table 1:

TABLE 1

|  | Composition (g wax powder/ litre liquid) | Coverage (ml coating composition/m$^2$) |
| --- | --- | --- |
| Porous substrates | 140-150 | 125-350 |
| Steel/painted surface | 10-15 | 50-85 |
| Stone, marble, slate etc. | 65-75 | 60-170 |

The coating compositions are prepared by suspending a selected amount of polyolefin wax or the mixture of polyolefin waxes in a selected amount of a selected liquid, if desired in the presence of dispersion agents, in a manner known per se, e.g. as further disclosed in the examples.

According to other aspects of the present invention, there is provided a

Use of the present coating composition for treating a surface. The coating composition comprises particles of a polyolefin wax or of a mixture of polyolefin waxes suspended in a liquid phase. wherein the mixture of polyolefin wax or the components in the mixture of polyolefin waxes are selected from the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected from the group consisting of diluting agents, dispersing agents, conservation agents, emulsifying agents and coloring agents.

Use of the present coating composition for providing a surface with an essentially permanent anti-graffiti coating. Comprises particles of a polyolefin wax or of a mixture of polyolefin waxes suspended in a liquid phase, wherein the mixture of polyolefin wax or the components in the mixture of polyolefin waxes are selected from the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected form the group consisting of dilutingagent, dispersing agents, conservation agents, emulsifying agents and coloring agents.

Use of the present coating composition for providing a surface with an essentially permanent coating protecting against pollution and corrosion. The coating composition comprises particles of a polyolefin wax or of a mixture of polyolefin waxes suspended in a liquid phase, wherein the mixture of polyolefin wax or the components in the mixture of polyolefin waxes are selected form the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected from the group consisting of diluting agents, dispersing agents, conservation agents, emulsifying agents and coloring agents.

Use of the present coating composition for providing an underwater structure, e.g. a ship hull, with an essentially permanent anti-fouling coating. The coating comprises particles of a polyolefin wax or of a mixture of polyolefin waxes suspended in a liquid phase, wherein the mixture of polyolefin wax or the components in the mixture of polyolefin waxes are selected from the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected from the group consisting of diluting agents, dispersing agents, conservation agents emulsifying agents and coloring agents.

According to other aspects of the present invention, there is provided an

Article of manufacture comprising a structure with a surface coated with the present coating composition. The surface is treated by providing a coating composition as described above, applying the coating composition to the surface, evaporating the liquid phase from the applied coating composition, and subjecting the dried, applied coating composition to a heat treatment to coalesce the wax particles. The coating composition can be applied to the surface by spraying, and may be applied to the surface in an amount of 50 to 350 ml per m$^2$.

Article of manufacture comprising a structure with a surface coated by use of the present coating composition. The coating composition comprises particles of a polyolefin wax or of a mixture of polyolefin waxes suspended in a liquid phase, wherein the mixture of polyolefin wax or the components in the mixture of polyolefin waxes are selected from the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected from the group consisting of diluting agents, dispersing agents, conservation agents, emulsifying agents and coloring agents.

In one embodiment the article is a set of blades of a turbine, such as a windmill turbine. One advantage of using the method described above and/or the coating composition described above is to provide the blades with a durable and protective surface coating.

In one embodiment the article is a tank for fluids or solid substances, e.g. a metal tank or a glasfibre tank. One advantage of using the method described above and/or the coating composition described above is to provide the metal tank with a durable and protective surface coating.

In one embodiment the article is a plate made of eternit (fibre cement), particularly for the roofing and facing purposes for buildings. One advantage of using the method described above and/or the coating composition described above is to provide plates made of eternit (fibre cement) with a durable and protective surface coating.

In one embodiment the article is a plate made of marble, particularly for facades for buildings. One advantage of using the method described above and/or the coating composition described above is to provide plates made of marble with a durable and protective surface coating.

In one embodiment the article is a metal object, particular a wing of an aeroplane. One advantage of using the method described above and/or the coating composition described above is to provide the metal object with a surface coating to improve the de-icing of the metal object.

According to an aspect of the present invention, these objects may be obtainable by providing:

a method of treating a sheet comprising the steps of

Providing a coating composition comprising particles of a polyolefin wax or of a mixture of polyolefin waxes suspended in a liquid phase, wherein the mixture of polyolefin wax or the components in the mixture of polyolefin waxes are selected form the group consisting of polyethylene waxes, polypropylene waxes, and oxidized polyethylene and polypropylene waxes. The liquid phase may be an alcohol, preferably ethanol, and water. The coating composition can contain up to 10% by weight auxiliary agents selected form the group consisting of diluting agents, dispersing agents, conservation agents, emulsifying agents and coloring agents.

evaporating said liquid phase from the applied coating composition; and subjecting said dried, applied coating composition to a heating treatment to coalesce said wax particles;

and/or a method of producing a coated sheet comprising the steps of applying a coating composition as described above to at least one surface of the sheet;

evaporating said liquid phase from the applied coating composition;

subjecting said dried, applied coating composition to a heating treatment to raise the temperature of the dried coating composition to bring said particles of a polyolefin wax or of a mixture of polyolefin waxes into a coalescing state allowing said wax particles to provide a continuous coating of the sheet; and allowing said heat treatment coating to consolidate to a protective coating.

The polyolefin wax may be the polyolefin wax as disclosed in pending Danish patent application no. DK PA 2002 01135; in pending Danish patent application no. DK PA 2003 00655 (same applicant and same date of filing as present application), which applications both hereby are incorporated by reference.

In one embodiment two or more coatings are, applied to a sheet, and one coating is applied to another coating and so forth for any other coatings.

The sheet comprises one or more films and it may also comprise an adhesive layer and a liner.

In one embodiment the sheet is a laminated structure.

In one embodiment the sheet is a film.

The adhesion of a film to a structure may be effected by e.g. surface tension properties and/or electrostatic properties of the film without a dedicated adhesive layer present.

In one embodiment the sheet is comprising an adhesive layer having a first major adhesive layer side and a second major adhesive layer side which defines the bottom surface of the sheet and a film having a first major film side and a second major film side, said second major film side being bonded to the first major adhesive layer side; and the coating composition being applied to said first major film side.

The term above "bonded to" means: a film and an adhesive layer is adhering to each other and the adhesive layer is covering the film side completely or almost completely such that essentially the full surface area of one of the two film sides of the film is in contact with essentially the full surface area of one of the two adhesive layer sides of the adhesive layer. The term "being bonded to" may in similar way as defined above also define a relationship between one side of one film and one side of another film with the exception that the forces between two such film sides may be of a different magnitude and nature than for the case of a film and an adhesive layer. Furthermore, the term "being bonded to" may in similar way as defined above also define a relationship between a major sheet surface and a surface of a liner with the exception that the forces between two such surfaces may be of a different magnitude and nature than for the case of a film and an adhesive layer.

In one embodiment the sheet is comprising an adhesive layer having a first major adhesive layer side and a second major adhesive layer side which defines the bottom surface of the sheet and a film having a first major film side and a second major film side, said second major film side being bonded to the first major adhesive layer side; and the coating composition being applied to said first major film side. In this embodiment the film has substantially a thickness of 0.025 mm and is made essentially of polyester and the thickness of the sum of the film and the adhesive layer is substantially 0.050-0.075 mm and the adhesive is pressure sensitive.

In one embodiment the sheet is comprising an adhesive layer having a first major adhesive layer side and a second major adhesive layer side which defines the bottom surface of the sheet and two or more films each having a first major film side and a second major film side; and each film is stacked upon another film such that a second major film side of a film above is bonded to a first major film side of a film below except the lowest film in the stacked which has its second major film side bonded to the first major adhesive layer side; and the topmost film side is subjected to said method of coating.

In one embodiment the sheet is comprising an adhesive layer having a first major adhesive layer side and a second major adhesive layer side which defines the bottom surface of the sheet and two or more films each having a first major film side and a second major film side; and each film is stacked upon another film such that a second major film side of a film above is bonded to a first major film side of a film below except the lowest film in the stacked which has its second major film side bonded to the first major adhesive layer side; and the topmost film side is subjected to said method of coating, and the second major adhesive layer side is applied to a structure.

When a sheet of this embodiment is applied to a structure it may in the course of time be preferred to expose another film layer in the stack of film layers. E.g., the topmost film layer treated to form a coating on the topmost film side may be removed, in part or fully, from the stack to expose a non-treated film layer. The non-treated film layer may thereafter be subject to said method of coating. In this way a renewal of a coated film layer may take place without the application of a new sheet to the structure. The adhesion force between such two film sides is of a magnitude such that a manual removal of one film adhered to another may be carried out by hand.

In one embodiment the sheet is comprising two or more pairs of layers, each pair of layers comprising an adhesive layer having a first major adhesive layer side and a second major adhesive layer side, and a film having a first major film side and a second major film side with the second major film side bonded to the first major adhesive layer side; and each pair of layers is stacked upon another pair of layers such that a second major adhesive layer side of a pair above is bonded to a first major film side of a pair of layers below; and the topmost film side is subjected to said method of coating.

In one embodiment the sheet comprises one film with a first major film side and a second major film side; and the first major film side and the second major film side are subjected to said coating method.

In one embodiment the film further comprises one or more of the applicable substances selected from the group of laquer, overprint clear, clearcoat or backing, and combinations thereof, applied to a major film side. In this embodiment the sheet may be applied after being subject to said method of coating, preferably may be applied followed by being subjected to said method of coating, to surfaces with a high wear rate, as e.g. floors in heavily trafficked areas.

In one embodiment the sheet has a thickness of between 20 μm and 8000 μm, preferably between 30 μm and 5000 μm, more preferably between 30 μm and 2000 μm, even more preferably between 30 μm and 500 μm. In one embodiment the film has a thickness of between 20 μm and 4000 μm, preferably between 20 μm and 2000 μm, more preferably between 20 μm and 500 μm, even more preferably between 20 μm and 250 μm.

The film is made of a material selected from the group consisting of polyester, polycarbonate, acrylic, polyurethanes, polyacetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and mixtures thereof, preferably said material is selected from the group consisting of polyester, acrylic, polyethylene, polypropylene, polyvinyl chloride, polystyrene, and mixtures thereof, more preferably said material is selected from the group consisting of polyester and polyvinyl chloride and mixtures thereof.

The film may be tinted or dyed, and it may be colorless, clear, opaque or transparent. In one aspect of the invention the graphic is printed on the film with one of many techniques for applying a graphic to a film, e.g. electrostatic printing, piezo ink jet printing, offset printing, screen printing or thermal ink jet printing. In one embodiment the film is essentially a polyester film. In one embodiment the film is essentially a vinyl film.

The adhesive layer is made of a material selected from the group consisting of acrylics, rubbers, polyolefins and mixtures thereof. The adhesive layer may be pressure-sensitive or non-pressure-sensitive. In one embodiment the adhesive layer is pressure-sensitive.

In one embodiment the adhesive layer further comprises one or more substances selected from the group consisting of tackifiers, oils, stabilizers, flame-retardants, UV-light absorbers and mixtures thereof.

In one embodiment the adhesive layer has a thickness of between 5 μm and 150 μm, preferably between 10 μm and 50 μm, more preferably between 10 μm and 25 μm.

The sheet may be prepared in several ways. The bonding layer may be extrusion coated and thereafter dried and/or cured.

In one embodiment of the invention, an article comprising a sheet is produced by applying a coating composition as described above to at least one surface of the sheet; evaporating the liquid phase from the applied coating composition; subjecting the dried, applied coating composition to a heating treatment to raise the temperature of the dried coating composition to bring the particle of the polyolefin wax or a mixture of polyolefin waxes into a coalescing state, thereby allowing the wax particles to provide a continuous coating of the sheet; and allowing the heat treated coating composition to consolidate to norm a protective coating.

In one embodiment of the invention an article comprising a sheet is produced by applying a coating composition as described above to at least one surface of the sheet; evaporating the liquid phase from the applied coating composition; subjecting the dried, applied coating composition to a heating treatment to raise the temperature of the dried coating composition to bring the particle of the polyolefin wax or a mixture of polyolefin waxes into a coalescing state, thereby allowing the wax particles to provide a continuous coating of the sheet; and allowing the heat treated coating composition to consolidate to form a protective coating, which article further comprises a liner bonded to a major sheet surface.

The liner comprises a material selected from the group of kraft paper, polyethylene coated paper, polymer liner.

In one embodiment of the invention the article is provided as a roll.

In one embodiment of the invention the article is provided as a separate sheet. A separate sheet is defined as a sheet, which can be manipulated without the necessity of major modifications prior to applying the sheet, such as dividing the sheet. A separate sheet may though be manipulated with minor modifications after the application of the sheet, such as cutting smaller pieces of the sheet.

In one embodiment the sheet consists of a film on top of an adhesive layer, which adhesive layer is on top of a liner.

In one embodiment a structure has been covered fully or in part with an article which is a sheet treated by the above-described method, wherein the structure is selected from the group consisting of buildings, parts of buildings, elevators, windows, doors, tiles, walls, partitions, furniture, signs, bill boards, artwork, and vehicles.

In one embodiment the structure is covered fully or in part with a sheet coated as described above wherein the vehicle is selected from the group consisting of buses, trains, automobiles, and subway-trains.

In one embodiment the use of a sheet treated by the above-described method is for providing a surface of a structure with an essentially permanent anti-graffiti coating selected from the group consisting of buildings, parts of buildings, elevators, windows, doors, tiles, walls, partitions, furniture, signs, bill boards, artwork, and vehicles including buses, trains, subway trains, and automobiles.

In one embodiment the use of a sheet treated by the above-described method for providing a surface of a structure selected from the group consisting of buildings, parts of buildings, elevators, windows, doors, tiles, walls, partitions, furniture, signs, bill boards, artwork, and vehicles including buses, trains, subway trains, and automobiles with an essentially permanent coating protecting against pollution and corrosion.

In one embodiment a method provides a surface of a structure with a protective coating by coating a film on the structure comprising the steps of applying a coating composition as described above to the film; evaporating the liquid phase from the applied coating composition subjecting the dried, applied coating composition to a heat treatment to raise the temperature of the dried coating composition to coalesce the particles of polyolefin wax or mixtures of polyolefin waxes to provide a continuous coating on the film and allowing the heat treated coating composition to consolidate to a protective coating.

In one embodiment a method provides a surface of a structure with a protective coating by coating a film on the structure by applying a coating composition as described above to the film; evaporating the liquid phase from the applied coating composition subjecting the dried, applied coating composition to a heat treatment to raise the temperature of the died coating composition to coalesce the particles of polyolefin wax or mixtures of polyolefin waxes to provide a continuous coating on the film and allowing the heat treated coating composition to consolidate to a protective coating. In this embodiment, the sheet comprises an adhesive layer having a first major adhesive layer side and a second major adhesive layer side that defines the bottom surface of the sheet and film having a first major film side and a second major film side, wherein the second major film side is bonded to the first major adhesive side, and the coating composing is applied to the first major film side.

In one embodiment a method provides a surface of a structure with a protective coating by coating a sheet on the structure comprising the steps of applying a coating composition as described above to the sheet; evaporating the liquid phase from the applied coating composition subjecting the dried, applied coating composition to a heat treatment to raise the temperature of the died coating composition to coalesce the particles of polyolefin wax or mixtures of polyolefin waxes to provide a continuous coating on the film and allowing the heat treated coating composition to consolidate to a protective coating. In this embodiment the sheet comprises a first major adhesive layer side and a second major adhesive layer side that defines the bottom surface of the sheet, and two or more films, each having a first major film side and a second major film side, and each film is stacked upon another film such that a second major film side of a film above is bonded to a first major film side of a film below, except that the lowest film in the stack that has its second major film side is bonded to the first major adhesive layer side, and the topmost film side is subject to the coating method.

In one embodiment a method provides a surface of a structure with a protective coating by coating a sheet on the structure by applying a coating composition as described above to the sheet; evaporating the liquid phase from the applied coating composition; subjecting the dried, applied coating composition to a heat treatment to raise the temperature of the died coating composition to coalesce the particles of polyolefin wax or mixtures of polyolefin waxes to provide a continuous coating on the film and allowing the heat treated coating composition to consolidate to a protective coating. The sheet comprises two or more layers 205, each pair of layers 205 comprising an adhesive layer 202 having a first major adhesive layer side and a second major adhesive layer side, and a film 203 having a first major film side and a second major film side with the second major film side being bonded to the first major adhesive layer side, and each pair of layers 204 is stacked upon another pair of layers 204 such that a second mayor adhesive layer side of a pair above is bonded to a first major film side of a pair of layers 204 below, and the topmost film side 204 is subjected the present coating method.

In one embodiment a method provides a film as described above wherein the film further comprises one or more of the applicable structures selected from the group consisting of lacquer, overprint, clear, clearcoat or backing. and combinations thereof, applied thereto. In one embodiment a method provides a surface of a structure with a protective coating by coating a sheet on the structure comprising the steps of applying a coating composition as described above to the sheet; evaporating the liquid phase from the applied coatilig composition; subjecting the dried, applied coating composition to a heat treatment to raise the temperature of the died coating composition to coalesce the particles of polyolefin wax or mixtures of polyolefin waxes to provide a continuous coating on the film and allowing the heat treated coating composition to consolidate to a protective coating or a major film side.

In one embodiment a method provides a surface of a structure with a protective coating by coating a sheet on the structure comprising by applying a coating composition as described above to the sheet; evaporating the liquid phase from the applied coating composition; subjecting the dried, applied coating composition to a heat treatment to raise the temperature of the died coating composition to coalesce the particles of polyolefin wax or mixtures of polyolefin waxes to provide a continuous coating on the film and allowing the heat treated coating composition to consolidate to a protective coating. In this embodiment the sheet has a thickness of between 20 microns and 8000 microns, more preferably between 10 microns and 2000 microns, and more preferably between 30 microns and 500 microns, In one embodiment a method provides a surface of a structure with a protective coating by coating a film on the structure by applying a coating composition as described above to the film; evaporating the liquid phase from the applied coating composition; subjecting the dried, applied coating composition to a heat treatment to raise the temperature of the died coating composition to coalesce the particles of polyolefin wax or mixtures of polyolefin waxes to provide a continuous coating on the film and allowing the heat treated coating composition to consolidate to a protective coating. The film has a thickness of between 20 microns and 40000 microns, preferably between 20 microns and 2000 microns, more preferably between 20 microns and 3500 microns, even more preferably between 20 microns and 250 microns.

In one embodiment a structure has been subjected to the method as described above wherein the structure is selected from the group consisting of buildings, elevators, windows, doors, tiles, walls, partitions, furniture, signs, bill boards, artwork, and vehicles.

In one embodiment the structure is a vehicle provided with a film having a thickness as described above, wherein the vehicle is selected from the group consisting of buses, trains, automobiles, and subway-trains.

In one embodiment the use of the method as described above provides a surface of a structure as described above with an essentially permanent anti-graffiti coating.

In one embodiment the use of the method described above is for providing a surface of a structure as described above with an essentially permanent coating protecting against pollution and corrosion.

In one embodiment the use of the method described above provides a surface of a structure as described above with an essentially permanent anti-graffiti coating.

In one embodiment the use of the method described above for providing a surface of a structure as described above with an essentially coating against pollution and corrosion.

BRIEF DESCRIPTION OF THE DRAWINGS

In the following, by way of examples only, the embodiments of the present invention are further disclosed with detailed description of preferred embodiments. Reference is made to the drawings in which.

DETAILED DESCRIPTION

Figure 1A:
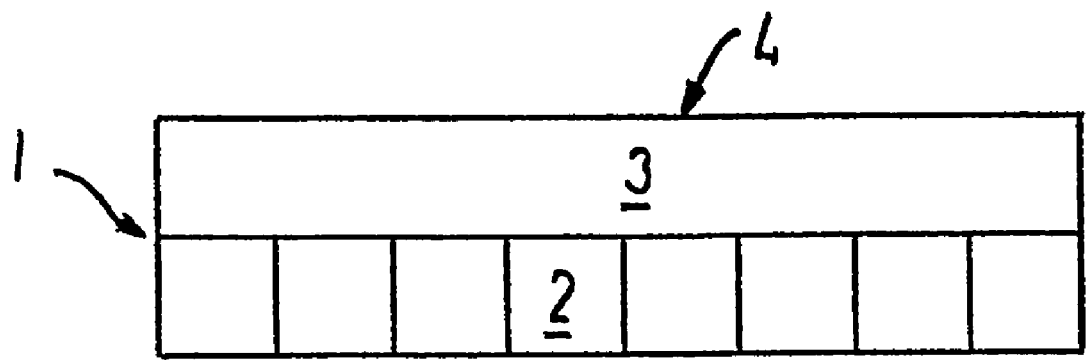
FIG. 1a illustrates schematically a first type of a sheet.

FIG. 1a illustrates a sheet 1 schematically in section side view. The sheet 1 consists of a film 3 on top of an adhesive layer 2. The film 3 and the adhesive layer 2 is bonded to each other and the sheet is shown as a laminated structure. The first major film side 4, which is also the topmost surface of the sheet, is also shown.

Figure 1B:
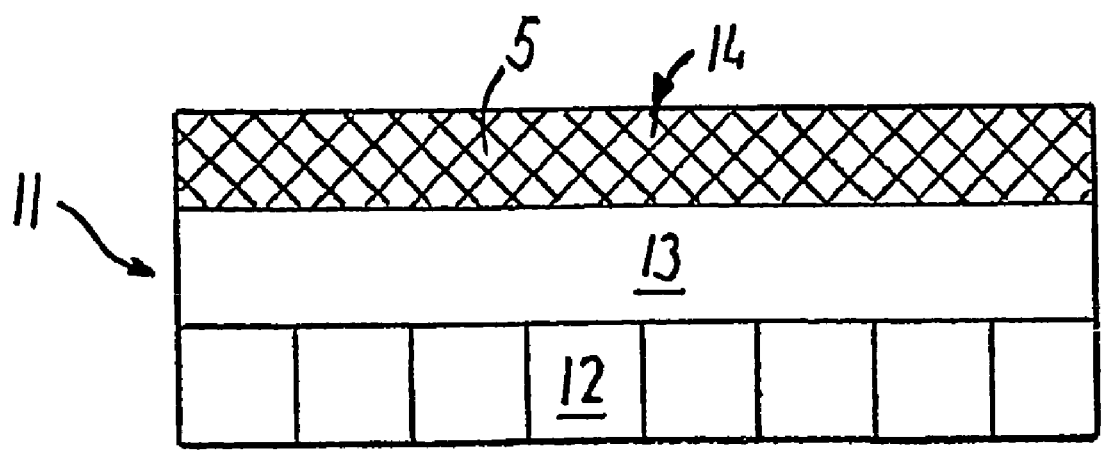
FIG. 1b illustrates schematically the first type of a sheet with a coating.

FIG. 1*b* shows the sheet of FIG. 1*a* where a coating 5 has been applied to the first major film side 14, which is also the topmost surface of the sheet 11.

Figure 2:
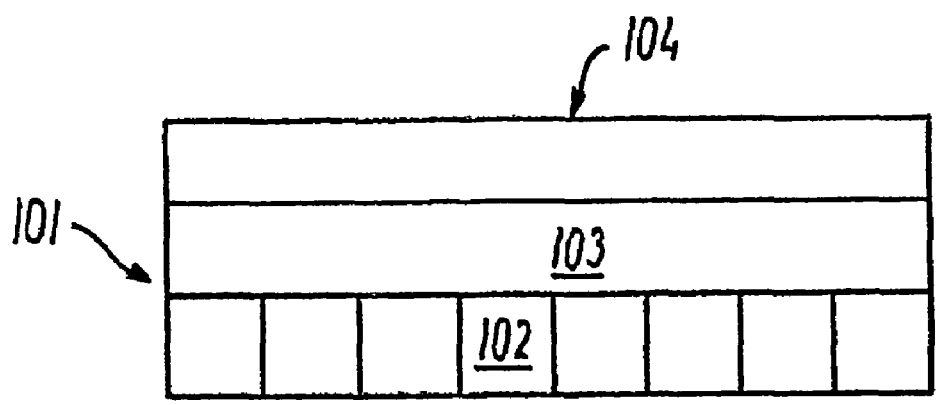
FIG. 2 illustrates schematically a second type of a sheet.

FIG. 2 illustrates a sheet 101 schematically in section side view. The sheet 101 consists of two films 103 stacked upon each other to form a stack of films. The stack of films is on top of an adhesive layer 102. The major side of the above film of the stack is bonded to the major surface of the below film of the stack as well as the major side of the below film and the major adhesive layer side is bonded to each other. The sheet 101 is shown as a laminated structure. The topmost film surface is a major first film side 104 and is subject to a coating method.

Figure 3:
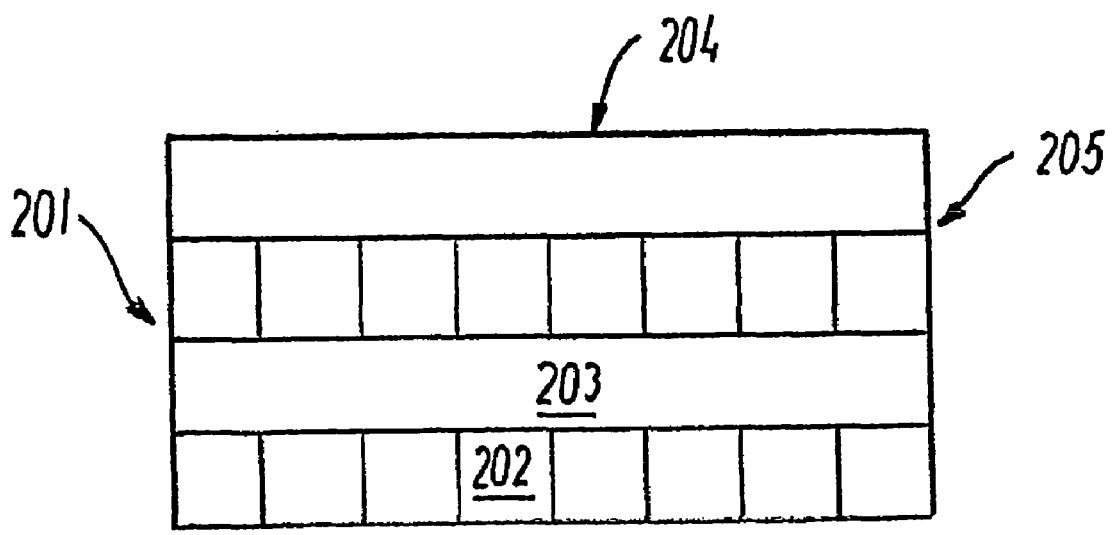
FIG. 3 illustrates schematically a third type of a sheet.

FIG. 3 illustrates a sheet 201 schematically in section side view. The sheet 201 consists of two pairs 205. Each pair 205 is shown identical and consists of a film 203 on top of an adhesive layer 202. The two pairs 205 are stacked upon each other with the film 203 of the below pair bonded to the adhesive layer 202 of the above pair. The topmost film surface is a major first film side 204 and is subject to a coating method.

Figure 4:
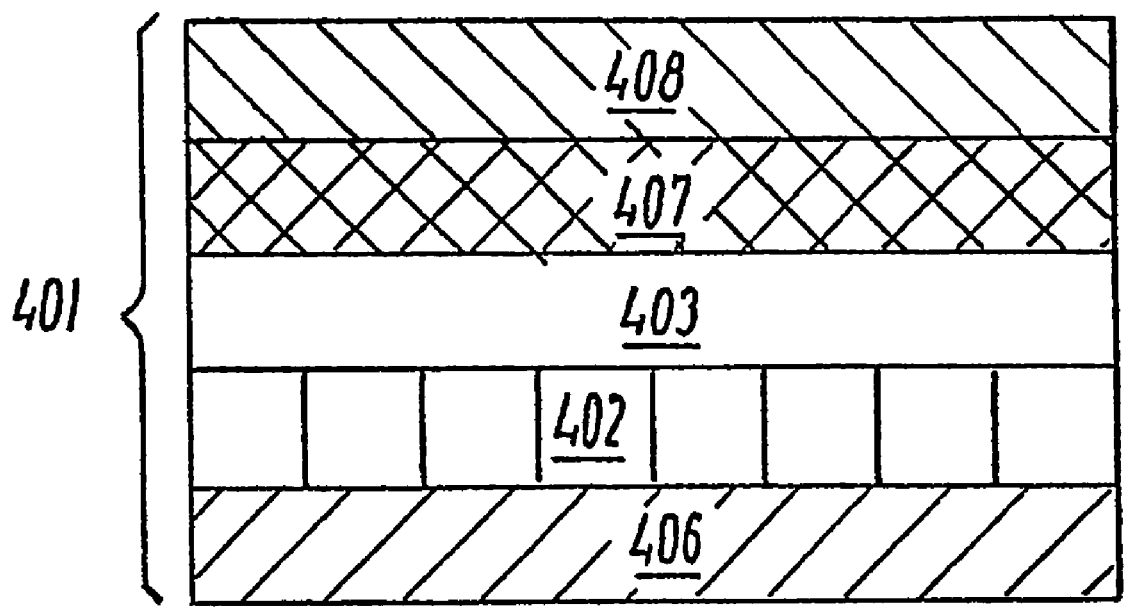
FIG. 4 illustrates schematically a fourth type of a sheet with a coating.

FIG. 4 illustrates a coated sheet 401 schematically in section side view. The sheet 401 consists of a coating 408 on top of a clearcoat 407. The clearcoat 407 is on top of a first major film side of a film 403, and the film 403 is on top of an adhesive layer 402, and the adhesive layer 402 is on top of a liner 406.

The invention will now be illustrated by way of the following examples which are for the purpose of illustration only and are in no way as to be considered limiting. In the following examples all parts and percentages are by weight and all temperatures and degrees are Celsius unless otherwise indicated.

EXAMPLES

Preferred embodiments of the invention are further illustrated by examples which are for the purpose of illustration only and are in no way as to be considered limiting.

The materials used in the examples were as follows:

Waxes:

Carnauba Wax: Carnauba Wax, Type CARNAUBA CARE 100, from Brenntag Nordic, Melting point: 80-86° C., Acid value (ASTM D 1386): 2-7.

Ceresin wax: Ceresin wax powder, Specific gravity: 0.8 g/cm$^3$, Boiling point approx. 300° C., Melting point 57-59° C.

PE (1): Polyethylene wax powder, DAVOSI, Average particle size: 3-5 µm,

Specific gravity: 0.96-0.98 g/cm$^3$, Drop forming point (DGF-M-III 3): 125° C.

PE (2): Polyethylene wax powder, Shamrock S 394, N1, Average particle size: 5 µm, Specific gravity: 0.95 g/cm$^3$, DSC melt point: 113° C., Softening point: 99° C.

PE (3): Polyethylene wax powder, Shamrock S 394, SP 5, Average particle size: 18 µm, Specific gravity: 0.95 g/cm$^3$, DSC melt point: 113° C., Softening point: 99° C.

PP (1): Polypropylene copolymer-wax powder, Shamrock S 363, Average particle size: 5 µm, Specific gravity: 0.94 g/cm$^3$, DSC melt point: 140° C., Softening point: 68° C.

PTFE (1): 60% aqueous dispersion of polytetrafluorethylene, Shamrock FLUORO AQ 60, Average particle size: 2-3 µm, pH: 7-8, Apparent density: 1.47

Solvents/Acids:

Oil: Paraffin oil pharmaceutic grade, Parafluid type PL501A from Parafluid Mineralölgesellschaft GmbH, Hamburg, Germany Acetone: Commercial grade, Borup Kemi AS, Denmark Xylene: Commercial grade, Borup Kemi AS, Denmark White Spirit: Commercial grade, Borup Kemi AS, Denmark Alcohol: Denaturated Ethyl alcohol, Commercial grade, Borup Kermi AS, Denmark Concentrated Sulphuric Acid: 96% Commercial grade, Borup Kemi AS, Denmark Water: Tap water Auxiliary Agents:

Coloring Agent: Aquatop Teknomix 2990 from Teknos Denmark AS

Comparison Tests:

Comparison Example A

Carnauba Wax

Surface: Concrete plate 90×160 mm.

A mix of oil and Carnauba wax (90:10) was heated in small container until melting of the wax. Immediately after the mix was applied by brush on to the concrete plate.

Dried for 24 hours at 20 degrees C., 65% rel. humidity.

Then a solvent based graffiti paint was spayed on to the coated surface and settled for 24 hours at 20 degrees C., 65% rel. humidity.

Then the graffiti was subjected to high pressure (water, 90-100 bar) cleaning

Result: The graffiti could not be removed by high pressure (water 90-100 bar) cleaning.

Comparison Example B

Ceresin Wax

Surface: Concrete plate 90×160 mm.

A mix of oil and Ceresin wax (90:10) was heated in small container until melting of the wax. Immediately after the mix was applied by brush on to the concrete plate in a thin layer.

Dried for 24 hours at 20 degrees C., 65% rel. humidity.

Then a solvent based graffiti paint was spayed on to the coated surface and settled for 24 hours at 20 degrees C., 65% rel. humidity.

Then the graffiti was subjected to high pressure (water, 90-100 bar) cleaning

Result: The graffiti could not be removed by high pressure (water 90-100 bar) cleaning.

Examples According to the Present Invention

The following coating compositions were prepared and used in the following examples:

| Coating composition | PE(1) (PPW) | PE(2) (PPW) | PE(3) (PPW) | PP(1) (PPW) | PTFE(1) (PPW) | Alcohol (PPW) |
|---|---|---|---|---|---|---|
| 1 | 10 | | | | | 1000 |
| 2 | | 10 | | | | 1000 |
| 3 | | | 10 | | | 1000 |
| 4 | | | | 10 | | 1000 |
| 5 | | | | | 10 | 1000 |

Example 1

PE (1) Davosi-Polyethylene Wax Powder

Surface: Glass plates 70×150 mm; Steel plates 150×150 mm Quantity applied: 6.7 $10^{-5}$ ml/cm$^2$ The wax mix was applied by airless spray gun on to the steel plates and dried for 3 hours. It was observed that the surface of the test specimen was covered by a white wax powder. Then the surface of the test specimen were heated by a Ripack 2000 gas heated gun until the white wax powder was melting and become transparent.

Settled for 12 hours at 20 degrees C., 65% relative humidity

Then solvent based graffiti paint was spayed on to the coated surface and the paint settled for 24 hours at 20 degrees C., 65% relative humidity.

Observations:

The graffiti was easily removed by a brush and lukewarm water as well as by high pressure cleaning (water, 90-100 bar).

Similar tests were carried out on the following test specimen substrates:

| | |
|---|---|
| Steel plates with car lacquer | 100 × 100 mm |
| Concrete plates | 100 × 100 mm |
| Slate plates, smooth | 100 × 100 mm |
| Slate plates, rough, | 100 × 100 mm |
| Granite plates, smooth | 100 × 100 mm |
| Granite plates, rough | 100 × 100 mm |
| Marble plates, smooth | 100 × 100 mm |
| Sand stone plates, | 100 × 100 mm |

Observations for all Layers:

The graffiti was easily removed by a brush and lukewarm water as well as by high pressure cleaning (90-100 bar).

On one of the test steel specimen up to 50 repetitive layers of graffiti paint was applied and removed on the same wax coating.

To test the wear resistance on another of the test specimen steel plates 1000 repetitive grindings (of 30 seconds each) made with a 3M hard, green kitchen sponge. Then solvent based graffiti paint was spayed on to the coated surface and settled for 24 hours at 20 degrees C., 65% relative humidity.

Further Observation:

On non heated surfaces the wax coating was easily removed by a cloth or a soft sponge.

On one of the sandstone specimens, coated on one side only, a solvent based graffiti paint was sprayed on as described in the above on both the coated side as well as on the non coated side.

Observations:

On the coated side the graffiti was easily removed by a brush and lukewarm water as well as by high pressure cleaning (water, 90-100 bar). On the non coated side the graffiti could not be removed.

Then concentrated sulphuric acid was applied in a thin layer on approx. 50% of the coated side.

90 minutes later the acid was removed by clean water and the surface was dried.

Observations:

No visible attack from the sulphuric acid was detected.

1 hour later a new layer of graffiti paint was applied and settled as previously described.

Observations:

The graffiti was easily removed by a brush and lukewarm water as well as by high pressure cleaning (90-100 bar).

On the non coated side a similar test with sulphur acid was made.

Observations:

The graffiti paint was diluted/destroyed by the acid, which has also started to deteriorate the surface of the sandstone.

To investigate the effect of the heating treatment of the wax composition a number of specimens with a diameter of approx. 60 mm and a thickness of up to 15 mm were molded by heating up approx. 15 g of wax powder in a metal cup.

4 specimens were dyed into brown respectively blue, green and black colors.

The molded specimens were submerged into various liquids such as:

Concentrated Sulphuric Acid

Alcohol

White Spirit

Xylene

Acetone

Tap water

Observations After 21 Days:

No damages or any kind of visible deterioration of the specimens were detected. No coloring of the liquids was observed.

1 colored specimen was submerged into sea water for 18 months.

Observation:

No damages or any kind of visible deterioration were detected.

Test for Diffusion Openness

To evaluate the diffusion openness a test was carried out on a plate of concrete (100×150×12 mm) treated as previously described on all sides with the exception of a circle with a diameter of 40 mm on one of the sides.

Exactly on the said circle a glass tube with a diameter of 40 mm and a height of 600 mm was glued on to the steel plate with silicone.

The tube was filled With 500 him clean water and the plate was placed on 4 pieces of wood in each corner to raise it from the table plate.

Observation:

After 5-10 seconds the water began to drip very fast through the coated concrete plate.

Test on Traffic Sign:

On a special light reflection treated traffic sign a test was carried out to verify whether the degree of light reflection was reduced by our coating.

The wax mix was applied by airless spray gun on to the steel plates and dried for 3 hours. Then the surface of the test specimen were heated by a Ripack 2000 gas heated gun until the white wax powder was melting and become transparent.

Settled for 12 hours at 20 degrees C., 65% relative humidity,

Light test carried out during the night time proved that the coating do not have any adverse effect of the light reflection.

Test of Discoloration on Coated Surfaces:

Observations from a wide range of various test of numerous substrates has showed that change in colors and/or gloss is extremely small. Even on non painted steel only an extremely limited darkening and increase of gloss can be observed.

Test of Protection Against Moss and Algae:

Observations from a range of tests on concrete and steel have showed that the coating has a pronounced effect to avoid or strongly reduce growth of moss and algae in moist and wet environments.

Example 2

PE (2) Shamrock S 394, N1—Polyethylene Wax Powder

Surface: Glass plates 70×150 mm; Steel plates 150×150 mm Quantity applied: $6.7 \ 10^{-5}$ ml/cm$^2$ The wax mix was applied by airless spray gun on to the steel plates and dried for 3 hours. Then the surface of the test specimen were heated by a Ripack 2000 gas heated gun until the white wax powder was melting and become transparent.

Settled for 12 hours at 20 degrees C., 65% relative humidity

Then solvent based graffiti paint was spayed on to the coated surface and settled for 24 hours at 20 degrees C., 65% relative humidity.

Observations:

The graffiti was easily removed by a brush and lukewarm water as well as by high pressure cleaning (water, 90-100 bar).

Example 3

PE (3) Shamrock S 394, SP5—Polyethylene Wax Powder

Surface: Glass plates 70×150 mm; Steel plates 150×150 mm. Quantity applied: $6.7 \ 10^{-5}$ ml/cm$^2$ The wax mix was applied by airless spray gun on to the steel plates and dried for 3 hours. Then the surface of the test specimen were heated by a Ripack 2000 gas heated gun until the white wax powder was melting and become transparent.

Settled for 12 hours at 20 degrees C., 65% relative humidity

Then solvent based graffiti paint was spayed on to the coated surface and settled for 24 hours at 20 degrees C., 65% relative humidity.

Observations:

The graffiti was easily removed by a brush and lukewarm water as well as by high pressure cleaning (water, 90-100 bar).

Example 4

PP (1)) Shamrock S 363,—Polypropylene Wax Powder

Surface: Glass plates 70×150 mm; Steel plates 150×150 mm. Quantity applied: $6.7 \ 10^{-5}$ ml/cm$^2$ The wax mix was applied by airless spray gun on to the steel plates and dried for 3 hours. Then the surface of the test specimen were heated by a Ripack 2000 gas heated gun until the white wax powder was melting and become transparent.

Settled for 12 hours at 20 degrees C., 65% relative humidity

Then solvent based graffiti paint was spayed on to the coated surface and settled for 24 hours at 20 degrees C., 65% relative humidity.

Observations:

The graffiti was easily removed by a brush and lukewarm water as well as by high pressure cleaning (water, 90-100 bar).

Comparison Example

PTFE (1) Shamrock FLUORO AQ 60-60% Aqueous Dispersion of Polytetrafluorethylene Powder The wax dispersion diluted by 50% of water by airless spray gun was applied on to the steel plates and dried for 3 hours. Then the surface of the test specimen was heated by a Ripack 2000 gas heated gun.

Settled for 12 hours at 20 degrees C., 65% relative humidity

Then solvent based graffiti paint was spayed on to the coated surface and settled for 24 hours at 20 degrees C., 65% relative humidity.

Observation:

The graffiti was only partly removed by a brush and lukewarm water as well as by high pressure cleaning (90-100 bar), but the dispersion could not bond to the substrate and was easily removed by the said cleaning methods.

Conclusion:

The product is not useable for the intended purpose, presumably because the applied wax particles have not coalesced to a protective coating.

Dispersion Test Observations

Example 5

To investigate the behaviour of PE-wax powders such powders were suspended in the carrier (Ethanol), and a series of test specimens (see below) were observed in an electronic microscope.

Test Specimens—Glass Plates:

Davosi wax, PE (1)—mixed with Ethanol and sprayed on to a glass plate.

Davosi wax, PE (1)—mixed with Ethanol and sprayed and heated on to a glass plate.

Shamrock type S-394 SP5 wax—mixed with Ethanol and sprayed on to a glass plate

Shamrock type S-394 SP5 wax—mixed with Ethanol and sprayed and heated on to a glass plate.

Shamrock type S-394 N1 wax—mixed with Ethanol and sprayed on to a glass plate

Shamrock type S-394 N1 wax—mixed with Ethanol and sprayed and heated on to a glass plate Observations:

From the observations it was evident that the wax powder was not dissolved in the ethanol. It was clear that the wax particles were intact in all the specimens where the various wax powders were mixed with ethanol.

Likewise it seems to be evident that after the heat treatment the wax particles were converted into a transparent, homogeneous, permanent very stable heat and chemical resistant sheet.

Additional Tests for Anti-Fouling Applications

Example 6

Test with GRP-Plate

A gel-coated GRP plate approx. 100×400 mm was treated on 50% of one side.

The wax mix (10 g of Davosi polyethylene wax powder in 1000 g of ethanol 96%) was applied by airless spray gun on to the steel plates and dried for 3 hours. Then the surface of the test specimen were heated by a Ripack 2000 gas heated gun until the white wax powder was melting and become transparent.

Settled for 12 hours at 20 degrees C. at 65% relative humidity.

The test specimen was submerged into seawater in the Leisure Boat Marine in Bogense, Denmark for 30 days.

Observations after 30 days:

The non treated/coated surface was green from algae, sticking strongly to the surface.

The treated/coated surface seemed to be like slightly dusty after curing in open air, but the very fine particles (not algae) were, easily removed by a soft hand.

Example 7

Test with Steel Plate

Test specimen: A black steel plate, dimensions: 150×150 mm.

50% of the one side (approx. 75×150 mm) was coated.

The wax mix (10 g of Davosi polyethylene wax powder in 1000 g of ethanol 96%) was applied by airless spray gun on to the steel plates and dried for 3 hours. Then the surface of the test specimen were heated by a Ripack 2000 gas heated gun until the white wax powder was melting and become transparent.

Settled for 12 hours at 20 degrees C., 65% relative humidity

The test specimen was submerged into seawater in the Leisure Boat Marine in Bogense, Denmark for 30 days.

Observations After 30 Days:

The non-treated/coated surface was heavily rusty and barnacled.

The treated surface was slightly dirty (easily removed by a brush and clean water), but the plate otherwise was not attacked by rust or algae.

Tests for Diffusion Openess

Example 8

Test 1

A smooth concrete specimen with dimensions 100×200× 10 mm was coated with a coating composition on all faces except for a circular area with a diameter of 40 mm. The coating composition was prepared by mixing 100 g of polyethylene wax powder type Davosi into 1 liter of ethanol 96%.

The coating composition was applied by airless spray gun and dried for 2 hours. It was observed that after evaporation of the carrier (ethanol) a white wax powder covered the surface of the sheet. Then a Ripack 2000 gas heated gun heated the surface until the white wax powder was melting and become transparent, and thereafter the coating was settled for 48 hours.

At the untreated circular area a glass tube with a diameter of 40 mm and a height of 600 mm was fixed in silicone mastic and settled for 24 hours.

The glass tube was filled with cold tap water and the concrete specimen was placed on four steel bolts with a diameter of 10 mm to lift the specimen from the table.

Observations:

After 4-5 seconds the first drops of water hit the table plate and the water was dripping through the concrete specimen with 1-2 drops per second.

Test 2

A similar test as described in the above test 1 was carried out to see if more separate coatings could reduce or eliminate the diffusion openness.

A smooth concrete specimen with dimensions 100×200× 10 mm was coated with a coating composition on all faces except for a circular area with a diameter of 40 mm. The coating composition was prepared by mixing 100 g of polyethylene wax powder type Davosi into 1 liter of ethanol 96%. The coating composition was applied in three successive coating treatments by airless spray gun onto the surface. For each coating treatment it was observed that after evaporation of the carrier (ethanol) a white wax powder covered the surface. After the evaporation of the carrier the surface was dried for 2 hours. Then a Ripack 2000 gas heated gun heated the surface until the white wax powder was melting and become transparent, and settled for 48 hours. Each of the three coatings was applied with an interval of 6 hours.

At the untreated circular area a glass tube with a diameter of 40 mm and a height of 600 mm was fixed in silicone mastic and settled for 24 hours.

The glass tube was filled with cold tap water and the concrete specimen was placed on four steel bolts with a diameter of 10 mm to lift the specimen from the table.

Observations:

After, 4-5 seconds the first drops of water hit the table plate and the water was dripping through the concrete specimen with 1-2 drops per second.

Conclusion: The diffusion openness is not reduced or eliminated if up to three coatings is applied.

Test for Chemical Resistance

Example 9

To test the chemical resistance the following test was carried out.

Specimens of concrete and marble with dimensions 97×35×10 mm were used in the test.

Solutions of hydrochloric acid were used on the specimens.

| Specimen | Exposure | Observations |
|---|---|---|
| 1 Coated concrete | 30 minutes | No visual damages/deterioration |
| 2 Coated concrete | 20 hours | No visual damages/deterioration |
| 3 Uncoated concrete | 3 minutes | Heavy deterioration - 25% |
| 4 Uncoated concrete | 5 minutes | Very heavy deterioration 50% |
| 5 Uncoated concrete | 60 minutes | Only small stones left |
| 6 Coated marble, one side only | 6 minutes | Heavy deterioration on uncoated sides - 15% <br> No Visual damages/deterioration on coated side |
| 7 Coated marble, one side only | 60 minutes | The marble completely disappeared. A very thin transparent sheet was observed floating in the acid solution. |

Test of Durability of Coating on a Steel Plate

Example 10

A coating composition was prepared by mixing 10 g of polyethylene wax powder Davosi into 1 liter of ethanol 96%. The coating composition was applied by airless spray gun onto half the area, denoted area 1, of a steel plate with dimensions 150×150 mm and dried for 3 hours. It was observed that when the ethanol had evaporated a white wax powder covered the surface. Then a Bosch air heated gun heated the surface until the white wax powder was melting and become transparent. The composition was settled for 12 hours at 20° C., 65% relative humidity. A solvent-based graffiti paint was sprayed on to the total surface (area 1+area 2) and settled for 24 hours at 20° C., 65% relative humidity.

Observations:

The graffiti paint in area 1 was easily removed using a nail and/or a credit card. In area 2 a nail and/or a credit card could not remove the graffiti.

Continued Test:

With two days interval the process of applying a new graffiti layer and removal of the settled graffiti paint was repeated. 50 repetitive layers of graffiti paint were applied/removed on the plate.

Observations:

The graffiti paint in area 1 was easily removed using a nail and/or a credit card. The graffiti paint in area 2 could not be removed using a nail and/or a credit card.

Additional Tests

Additional materials were tested. The materials are described in the table below with indication of selected physical parameters.

| No. | Brand name/ composition | density g/ml | particle size μm | DSC peak melting point | $M_w/M_n$ | Viscosity | Acid number mg/g KOH |
|---|---|---|---|---|---|---|---|
| A1 | Licowax PE 190/PE | 0.96 | | 130° C. | 19200/7300 | 25000 mPa s @ 140° C. | 0 |
| A2 | Ceridust VP 3610/PE | 0.96 | 5-8 | 124° C. | | | 0 |
| A3 | Ceridust 3620/PE | 0.97 | 8.5-13 | 127° C. | 5350/1350 | | 0 |
| A4 | Ceridust 3719/ modified PE | 0.98 | 13-22 | 121° C. | | | 18 |
| A5 | Ceridust 3715/PE | 0.97 | 8.5-13 | 127° C. | 5060/1240 | | 4 |
| A6 | Ceridust 3910 amide wax | 1.00 | 6.5-12 | 142° C.* | | | 6 |
| A7 | Ceridust 5551 ester wax | 1.00 | 8.5-15 | 98° C.* | | | 15 |
| A8 | Permaid 1084 A/PE | | 5 | 120 +/− 4° C. | | | |

*Drop point values.
Materials were supplied by Clariant.
PE denotes polyethylene.

Dispersions of the materials A1-A7 were manufactured with various amounts of water and ethanol and the results of applying the coatings is described in the following. A8 was supplied as an aqueous dispersion by Clariant.

100% ethanol 96% vol. and 0% water:

The dispersions of A1-A4 showed a tendency to separate. A5-A7 formed stable dispersions.

The dispersions of A1-A7 were applied to steel plates, dried and thereafter heated using a heating gun. Graffiti paint was thereafter applied to the steel plates and allowed to settle.

Thereafter the ease of removal of the graffiti paint was tested, which resulted in the following results:

The graffiti paint on the coating resulting when using A1 could not be removed;

the graffiti paint on the coating resulting when using any of A2-A5 could be removed;

the graffiti paint on the coating resulting when using any of A6-A7 could not be removed.

50% ethanol 96% vol. and 50% water:

The dispersions of A1-A4 separated.

A5 formed a stable dispersion.

The dispersions of A1-A5 were applied to steel plates, dried and thereafter heated using a heating gun. Graffiti paint was thereafter applied to the steel plates and allowed to settle.

Thereafter the ease of removal of the graffiti paint was tested, which resulted in the following results:

The graffiti paint on the coating resulting when using A1-A4 could not be removed;

the graffiti paint on the coating resulting when using A5 could be removed.

0% ethanol 96% vol. and 100% water:

The dispersions of A1-A5 separated.

The dispersions of A1-A5 and A8 were applied to steel plates, dried and thereafter heated using a heating gun. Graffiti paint was thereafter applied to the steel plates and allowed to settle.

Thereafter the ease of removal of the graffiti paint was tested, which resulted in the following results:

The graffiti paint on the coating resulting when using A1-A5 could not be removed;

the graffiti paint on the coating resulting when using A8 could be removed.

Examples Relating to Sheets

Example 11

Test 1

A public bus from Marseilles' public transportation company had been applied with a decorative sheet of the brand 3M Scotchcal 639, High Gloss Overlaminate 639 covering all sides and doors of the bus.

A coating composition was prepared by mixing 10 g of polyethylene wax powder Davosi into 1 liter of ethanol 96%. The coating composition was applied by airless spray gun onto the sheet and dried for 3 hours. It was observed that when the ethanol had evaporated a white wax powder covered the surface of the sheet. Then the surface was heated by a Ripack 2000 gas heated gun until the white wax powder was melting and become transparent. The quantity of polyethylene wax powder applied was $6.7 \cdot 10^{-5}$ ml/cm². The composition was settled/heated for 3 hours at 20° C., 65% relative humidity.

A solvent-based graffiti paint was sprayed on to the coated surface in two areas approx. 0.1 m² and settled for 6 hours at 20° C., 65% relative humidity.

Observations:

The graffiti paint in a first of the two areas was easily removed by a brush and lukewarm water as well as by high pressure cleaning (water, 90-100 bar).

After Further 18 Hours:

The graffiti paint in the second of the two areas was easily removed by a brush and lukewarm water as well as by high pressure cleaning (water, 90-100 bar).

Test 2

Another test was carried out on a bus, which had been applied with a decorative sheet of the brand 3M Scotchcal 639, High Gloss Overlaminate 639 covering all sides and doors of the bus but the sheet was not coated as described in Test 1.

A solvent-based graffiti paint was sprayed on to the coated surface in two areas approx. 0.1 m² and settled for 6 hours at 20° C., 65% relative humidity.

Observations:

After 6 hours the graffiti paint could partly be removed by hard mechanically brushing with a hard brush.

After further 18 hours

The graffiti paint could not be removed.

Example 12

A sheet 210×320 mm, 3M Scotchcal 639, High Gloss Overlaminate 639 was coated with a pre-prepared coating composition.

The coating composition was prepared by mixing 7 g of polyethylene wax powder Davosi into 1 liter of ethanol 96%. The coating composition was applied by airless spray gun onto the sheet consisting of four part-areas denoted 1, 2, 3 and 4 such that the coating composition covered half of the sheet, namely the areas 1 and 2 and dried for 3 hours. It was observed that when the ethanol had evaporated a white wax powder covered the surface of the sheet. Then a Bosch air heated gun heated the surface of the sheet until the white wax powder was melting and become transparent. The composition was settled for 12 hours at 20° C., 65% relative humidity. A solvent-based graffiti paint was sprayed on to the entire sheet surface, areas 1×, and settled for 24 hours at 20° C., 65% relative humidity.

The sheet was then bended resulting in several hard folds to examine the flexibility of the applied coating. The self-adhesive laminate was then applied on 1 mm steel plate.

Observations:

The graffiti paint in area 1 was easily removed by using a nail and a credit card. This also applied where the laminate had been folded.

In area 3 the graffiti paint was sticking harder to the surface, but could be removed by a nail and a credit card.

Continued Test:

After another 24 hours an attempt to remove the graffiti paint in the areas 2 and 4 was made.

Observations:

The graffiti paint in area 2 was easily removed by using a nail and a credit card. This also applies to the "lines" where the folds where made.

The graffiti paint in area 4 could not be removed by using a nail or a credit card.

Example 13

A sheet of Blue Oracal Series 640 permanent foil was tested under same conditions as for the 3M 639 laminate described in Example 11.

The Preparation of the Coating Composition was Carried Out as in Example 11:

A coating composition was prepared by mixing 7 g of polyethylene wax powder Davosi into 1 liter of ethanol 96%. The coating composition was applied by airless spray gun onto the sheet consisting of four part-areas denoted 1, 2, 3 and 4 such that the coating composition covered half of the sheet, namely the areas 1 and 2 and dried for 3 hours. It was observed that when the ethanol had evaporated a white wax powder covered the surface of the sheet. Then a Bosch air heated gun heated the surface of the sheet until the white wax powder was melting and become transparent. The composition was settled for 12 hours at 20° C., 65% relative humidity. A solvent-based graffiti paint was sprayed on to the entire sheet surface, areas 1-4, and settled for 24 hours at 20° C., 65% relative humidity.

The sheet was then bended resulting in several hard folds to examine the flexibility of the applied coating. The self-adhesive laminate was then applied on 1 mm steel plate.

Observations:

The graffiti paint in area 1 was easily removed by using a nail and a credit card. This also applies to the lines where the folds where made.

In area 2 a nail or a credit card could not remove the graffiti paint.

Continued Test:

After another 24 hours an attempt to remove the graffiti paint in the areas 2 and 4 was made.

Observations:

The graffiti paint in area 2 was easily removed by using a nail and a credit card. This also applies to the "lines" where the folds where made.

The graffiti paint in area 4 could not be removed by using a nail or a credit card.

Example 14

A sheet, 3M Scotchcal 639, High Gloss Overlaminate 639 is coated with a coating composition prepared by mixing polyethylene wax powder Shamrock S-394 with a particle size of 5 μm with 1 liter of ethanol 96%. The coating composition is applied by one or more airless spray guns onto the sheet in a continuous process allowing the sheet to be moved continuously into a spraying-zone for spraying the coating composition onto the sheet. After application of the coating composition, the sheet-part emanating from the spraying-zone enters a drying-zone where the ethanol will evaporate. Thereafter the sheet-part emanating from zone where the particles of the coating composition melt. Thereafter the sheet-part emanating from the heating-zone enters a cooling-zone to let the melt composition solidify and form a substantially continuous coating on the sheet.

The coated sheet is thereafter subjected to solvent-based graffiti paint. The paint settles for 24 hours at 20° C., 65% relative humidity.

Observations:

It is found that the graffiti paint can be easily removed by a brush and luke-warm water as well as by high pressure cleaning (water, 90-100 bar).

Up to 50 repetitive layers of graffiti paint can be applied and removed on the same wax-coated sheet.

Example 15

A train wagon is applied with a sheet as set forth in Example 11. A coating composition prepared as in Example 11 is applied to the parts of the sheet-covered train wagon. Thereafter the sheet is subjected to the method in Example 11 of treating the surface.

The coated sheet is thereafter subjected to a solvent-based graffiti paint. Thereafter, the paint settles.

Observations:

It is found that the graffiti paint can be easily removed by a brush and luke-warm water as well as by high pressure cleaning (water, 90-100 bar). Up to 50 repetitive layers graffiti paint can be applied and removed on the same wax-coated sheet.

Example 16

A sheet as set forth in Example 11 is coated with a pre-prepared coating composition. The preparation of the coating composition is carried out as in Example 11. The coating composition is applied by one or more airless spray guns onto the sheet. After application of the coating composition, the sheet is dried and the ethanol evaporates. Thereafter the sheet is heat treated in order to melt the polyethylene particles. Thereafter the sheet is cooled to let the melt composition solidify and form a substantially continuous coating on the sheet.

The coated sheet is thereafter subjected to solvent-based graffiti paint. The paint settles for 24 hours at 20 degrees C., 65% relative humidity.

Observations:

It is found that the graffiti paint can be easily removed by a brush and luke-warm water as well as by high pressure cleaning (water, 90-100 bar).

Up to 50 repetitive layers of graffiti paint can be applied and removed on the same wax-coated sheet.

The invention claimed is:

1. Coalesced wax particles on a surface produced in accordance with the steps of:
providing a coating composition comprising particles of a polyolefin wax suspended in a liquid phase comprising alcohol and water or particles of a mixture of components comprising polyolefin waxes suspended in a liquid phase comprising alcohol and water, wherein the polyolefin wax or the mixture of polyolefin waxes are selected from the group consisting of polyethylene waxes, polypropylene waxes, oxidized polyethylene waxes and oxidized polypropylene waxes and where the boiling point of the liquid phase is lower than the differential scanning calorimetry (DSC) peak melting point of the polyolefin wax or the differential scanning calorimetry (DSC) peak melting point of the mixture of polyolefin waxes, applying the coating composition to a surface evaporating the liquid phase from the applied coating composition, and subjecting the dried, applied coating composition to a heating treatment to coalesce said wax particles.

2. The coalesced wax particles on a surface according to claim 1 wherein the coating composition, calculated on weight basis, contains:

polyolefin wax/mixture of polyolefin waxes 1-25% and liquid phase 99-75%.

3. The coalesced wax particles on a surface according to claim 2 wherein the coating composition, calculated on weight basis, contains up to 10% auxiliary agents selected from the group consisting of diluting agents, dispersing agents, conservation agents, emulsifying agents, and colouring agents.

4. The coalesced wax particles on a surface according to claim 1 wherein the polyolefin wax or one of the components in the mixture of polyolefin waxes suspended in the coating composition is a polyethylene wax.

5. The coalesced wax particles on a surface according to claim 4 wherein the particle size of the polyethylene wax is between 0.1 and 100 µm.

6. The coalesced wax particles on a surface according to claim 4 wherein the melting point of the polyethylene wax is between 70 and 200° C.

7. The coalesced wax particles on a surface according to claim 4 wherein the polyethylene wax is a high-density polyethylene, HDPE.

8. The coalesced wax particles on a surface according to claim 1 wherein the polyolefin wax or one of the components in the mixture of polyolefin waxes suspended in the coating composition is a polypropylene wax.

9. An article of manufacture comprising a structure with a surface obtained by use of the coating composition according to claim 1.

10. A method of treating a surface comprising the steps of providing a coating composition comprising particles of a polyolefin wax suspended in a liquid phase comprising alcohol and water or particles of a mixture of components of polyolefin waxes suspended in a liquid phase comprising alcohol and water, wherein the polyolefin wax or the components in the mixture of polyolefin waxes are selected from the group consisting of polyethylene waxes, polypropylene waxes, oxidized polyethylene waxes and oxidized polypropylene waxes, and where the boiling point of the liquid phase is lower than the differential scanning calorimetry (DSC) peak melting point of the polyolefin wax or the differential scanning calorimetry (DSC) peak melting point of the mixture of polyolefin waxes, applying said coating composition to the surface, evaporating said liquid phase from the applied coating composition, and subjecting said dried, applied coating composition to a heating treatment to coalesce said wax particles.

11. The method according to claim 10 wherein the coating composition is applied to the surface by spraying.

12. The method according to claim 10 wherein the coating composition is applied to the surface in an amount of 50 to 350 ml per m².

13. The method according to claim 10, wherein the surface is selected from the group consisting of surfaces of monuments; buildings; constructions having surface structures made of steel, aluminium, sandstone, marble, granite, slate, cement, fibre-reinforced cement, bricks, tiles, fibre glass-reinforced materials, and wood; public and private transportation vehicles; road and traffic signs; sheets; and ship hulls.

14. An article of manufacture comprising a structure with a surface obtained by the method according to claim 10.

15. The method of treating a surface according to claim 10, wherein said dried, applied coating composition is subjected to a heating treatment to raise the temperature of the dried coating composition to bring said particles of a polyolefin wax or of a mixture of polyolefin waxes into a coalescing state allowing said wax particles to provide a continuous coating of the surface, and allowing said heat treated coating composition to consolidate to a protective coating.

16. The method according to claim 15 wherein the coating composition is applied to the surface by spraying.

17. The method according to claim 15 wherein the coating composition is applied to the surface in an amount of 50 to 350 ml per m².

18. The method according to claim 15, wherein the surface is selected from the group consisting of surfaces of monuments; buildings; constructions having surface structures made of steel, aluminium, sandstone, marble, granite, slate, cement, fibre-reinforced cement, bricks, tiles, fibre glass-reinforced materials, and wood; public and private transportation vehicles; road and traffic signs; sheets; and ship hulls.

19. An article of manufacture comprising a structure with a surface obtained by the method according to claim 15.

20. A method according to claim 15, wherein said surface is the surface of a sheet and where said coating composition is applied to at least one surface of the sheet.

21. A method according to claim 20, wherein the sheet is a film.

22. A method according to claims 20, wherein the sheet comprises an adhesive layer having a first major adhesive layer side and a second major adhesive layer side which defines the bottom surface of the sheet and a film having a first major film side and a second major film side, said second major film side being bonded to the first major adhesive layer side; and the coating composition being applied to said first major film side.

23. A method according to claims 20, wherein the sheet comprises an adhesive layer having a first major adhesive layer side and a second major adhesive layer side which defines the bottom surface of the sheet and two or more films each having a first major film side and a second major film side, and each film is stacked upon another film such that a second major film side of a film above is bonded to a first major film side of a film below except the lowest film in the stacked which has its second major film side bonded to the first major adhesive layer side, and the coating composition is applied to the topmost side of the film.

24. A method according to claim 20, wherein the sheet comprises two or more pairs of layers, each pair of layers comprising an adhesive layer having a first major adhesive layer side and a second major adhesive layer side, and a film having a first major film side and a second major film side with the second major film side being bonded to the first major adhesive layer side; and each pair of layers is stacked upon another pair of layers such that a second major adhesive layer side of a pair above is bonded to a first major film side of a pair of layers below, and the coating composition being applied to the topmost side of said film.

25. The method according to claim 10, wherein said surface is the surface of a sheet and where said coating composition is applied to at least one surface of the sheet.

26. A method according to claim 25, wherein the sheet comprises an adhesive layer having a first major adhesive layer side and a second major adhesive layer side which defines the bottom surface of the sheet and a film having a first major film side and a second major film side, said second major film side being bonded to the first major adhesive layer side, and the coating composition being applied to said first major film side.

27. An article comprising a sheet treated by the method of any of claims 25 or 20.

28. An article according to claim 27 further comprising a liner bonded to a major sheet surface.

29. A structure which has been covered fully or in part with an article of claim 27, wherein the structure is selected from the group consisting of buildings, parts of buildings, elevators, windows, doors, tiles, walls, partitions, furniture, signs, bill boards, artwork, buses, trains, subway-trains, and automobiles.

* * * * *

UNITED STATES PATENT AND TRADEMARK OFFICE
CERTIFICATE OF CORRECTION

| | |
|---|---|
| PATENT NO. | : 7,638,165 B2 |
| APPLICATION NO. | : 10/522593 |
| DATED | : December 29, 2009 |
| INVENTOR(S) | : Jensen Moller et al. |

It is certified that error appears in the above-identified patent and that said Letters Patent is hereby corrected as shown below:

At column 11, line 44-45, delete the phrase "a viscosity of, 16 mPa s" and insert --a viscosity of 16 mPa s--.
At column 17, line 54, delete the word "dilutingagent" and insert --diluting agent--.
At column 19, line 44, delete the phrase "coatings are, applied" and insert --coatings are applied--.
At column 24, line 6, delete the word "allowingthe" and insert --allowing the--.
At column 24, line 22, delete "40000 microns" and insert --4000 microns--.

Signed and Sealed this

Thirty-first Day of August, 2010

David J. Kappos
*Director of the United States Patent and Trademark Office*